US012744245B2

(12) United States Patent
Xue et al.

(10) Patent No.: US 12,744,245 B2
(45) Date of Patent: Sep. 22, 2026

(54) POLYMER AND PREPARATION THEREOF, AND ELECTROLYTE FILM AND PREPARATION THEREOF

(71) Applicant: Contemporary Amperex Technology (Hong Kong) Limited, Hong Kong (CN)

(72) Inventors: Wenwen Xue, Ningde (CN); Chengyong Liu, Ningde (CN); Xiaoning He, Ningde (CN); Nannan Zhang, Ningde (CN); Bobing Hu, Ningde (CN); Xian Huang, Ningde (CN)

(73) Assignee: Contemporary Amperex Technology (Hong Kong) Limited, Hong Kong (CN)

( * ) Notice: Subject to any disclaimer, the term of this patent is extended or adjusted under 35 U.S.C. 154(b) by 78 days.

(21) Appl. No.: 18/938,398

(22) Filed: Nov. 6, 2024

(65) Prior Publication Data

US 2026/0135147 A1 May 14, 2026

Related U.S. Application Data

(63) Continuation of application No. PCT/CN2022/091467, filed on May 7, 2022.

(51) Int. Cl.
*C08F 220/60* (2006.01)
*C08F 8/00* (2006.01)
(Continued)

(52) U.S. Cl.
CPC ........... *H01M 10/0565* (2013.01); *C08F 8/00* (2013.01); *C08F 220/282* (2020.02);
(Continued)

(58) Field of Classification Search
CPC .. C08F 220/60; C08F 230/02; C08F 220/282; C08F 220/343; C08F 220/36; C08F 220/387
See application file for complete search history.

(56) References Cited

FOREIGN PATENT DOCUMENTS

CN 103772607 A 5/2014
CN 112625283 A 4/2021
(Continued)

OTHER PUBLICATIONS

International Search Report received in the counterpart international application PCT/CN2022/091467, mailed on Feb. 9, 2023.
(Continued)

*Primary Examiner* — Richard A. Huhn
(74) *Attorney, Agent, or Firm* — K&L Gates LLP

(57) ABSTRACT

This application provides a polymer, obtained by polymerizing monomer 1, monomer 2, and monomer 3, where monomer 1 has a structure of formula 1, monomer 2 has a structure of formula 2, and monomer 3 has a structure of formula 3, where R1, R2, R3, R4, R5, Rf, x, $A^+$, $Q^-$, and E are as defined in the specification. This application further provides a polymer electrolyte film including an interpenetrating network structure formed by the polymer and a carbonate polymer. The polymer electrolyte film provided in this application has excellent mechanical strength, improved ionic conductivity, and ionic mobility, and batteries prepared therefrom exhibit high-voltage resistance and excellent high-voltage cycling performance.

20 Claims, 3 Drawing Sheets

(51) Int. Cl.

| | |
|---|---|
| ***C08F 220/28*** | (2006.01) |
| ***C08F 220/34*** | (2006.01) |
| ***C08F 220/36*** | (2006.01) |
| ***C08F 220/38*** | (2006.01) |
| ***C08F 230/02*** | (2006.01) |
| ***C08J 5/22*** | (2006.01) |
| ***H01M 10/0565*** | (2010.01) |

(52) U.S. Cl.

CPC ........ *C08F 220/343* (2020.02); *C08F 220/36* (2013.01); *C08F 220/387* (2020.02); *C08F 220/60* (2013.01); *C08F 230/02* (2013.01); *C08J 5/2293* (2013.01); *C08F 2800/10* (2013.01); *C08F 2810/50* (2013.01); *C08J 2333/16* (2013.01); *C08J 2333/26* (2013.01); *C08J 2433/16* (2013.01); *C08J 2433/26* (2013.01); *C08J 2469/00* (2013.01); *H01M 2300/0082* (2013.01)

(56) References Cited

FOREIGN PATENT DOCUMENTS

| | | | |
|---|---|---|---|
| CN | 112820937 | A | 5/2021 |
| CN | 112838267 | A | 5/2021 |
| CN | 112979875 | A | 6/2021 |
| CN | 113167031 | A | 7/2021 |
| CN | 113571768 | A | 10/2021 |
| JP | 2012054071 | A | 3/2012 |
| JP | 2014022110 | A | 2/2014 |
| KR | 20120125498 | A | 11/2012 |
| KR | 20210018159 | A | 2/2021 |
| WO | 2023/145971 | A1 | 8/2023 |

OTHER PUBLICATIONS

Written Opinion of ISA received in the counterpart international application PCT/CN2022/091467, mailed on Feb. 9, 2023.

Stalin. Sanjuna et al. "Multifunctional Cross-Linked Polymeric Membranes for Safe. High-Performance Lithium Batteries", Chemistry of materials, vol. 30. No. 6. Feb. 20, 2018 (Feb. 20, 2018). ISSN: 0897-4756. p. 2059. left-hand column. paragraph 4—p. 2064. right-hand column. paragraph 4.

Extended European Search Report mailed Aug. 8, 2025, for corresponding European Patent Application Serial No. 22940998.2.

Notice of Reasons for Refusal (with English Machine Translation), mailed Jun. 3, 2025, for corresponding Japanese Patent Application Serial No. 2024-566011.

Notice of Allowance (with English Machine Translation), mailed Jul. 15, 2025, for corresponding Korean Patent Application Serial No. 10-2024-7038049.

Stalin et al., "Multifunctional Cross-Linked Polymeric Membranes for Safe, High-Performance Lithium Batteries", Chemistry of Materials 2018, 30, pp. 2058-2066.

POLYMER AND PREPARATION THEREOF, AND ELECTROLYTE FILM AND PREPARATION THEREOF

CROSS-REFERENCE TO RELATED APPLICATION

The present application is a continuation of International Application No. PCT/CN2022/091467, filed May 7, 2022, which is incorporated herein by reference in its entirety.

TECHNICAL FIELD

This application relates to a polymer. In addition, this application further relates to an electrolyte film containing the polymer, a secondary battery containing the electrolyte film, and a battery pack, battery module, and electric apparatus including the secondary battery.

BACKGROUND

In recent years, with increasingly wide use of lithium-ion batteries, lithium-ion batteries have been widely used in energy storage power supply systems such as hydroelectric, thermal, wind, and solar power plants, and many other fields including electric tools, electric bicycles, electric motorcycles, electric vehicles, military equipment, and aerospace. With significant development of lithium-ion batteries, higher requirements have been imposed on electrolytes thereof.

Currently, most commercialized lithium batteries use organic liquid electrolytes which have the advantages of high ionic conductivity ($10^{-3}$ S/cm) and good electrode surface infiltrability. However, organic liquid electrolytes have drawbacks such as easy flowability, volatility, and poor thermal stability, which greatly limit improvement of lithium batteries in safety. However, rapid development of modern society has imposed higher requirements on energy density and cycle life of batteries. Therefore, lithium metal negative electrode with high specific capacity (for example, 3860 mAh/g) and very low potential (for example, −3.04 V vs. $H_2/H^+$) have once again attracted the attention of researchers. However, high reactivity of lithium and lithium dendrite short circuits are insurmountable obstacles in the development of lithium metal. The advent of solid-state electrolytes has overcome this obstacle. Replacing organic liquid electrolytes with solid-state electrolytes not only fundamentally solves the safety issue of batteries but also makes it possible to further develop lithium metal batteries.

Using aluminum-based polymers as solid polymer electrolyte films in lithium metal secondary batteries is currently a relatively effective means. However, there is still room for improvement in high-voltage resistance and safety performance of solid polymer electrolyte films. Therefore, there is still a need to provide a solid-state electrolyte film that has high mechanical strength, good high-voltage resistance, and excellent flame retardant performance.

SUMMARY

This application is made in view of the above issues, aiming to provide a polymer and a preparation method thereof. The polymer has good flame retardant performance, resistance to oxidation under high voltage, and capability of improving ionic conductivity and lithium ion transference number when used as an electrolyte film material, and is suitable for a high-voltage battery system. In addition, this application further provides a solid-state electrolyte film and a preparation method thereof. The solid-state electrolyte film contains the polymer, and has good interface contact with electrodes, high ionic conductivity, good high-temperature stability, and good mechanical performance. In addition, this application further provides a secondary battery including the electrolyte film.

Therefore, a first aspect of this application provides a polymer obtained by polymerizing monomer 1, monomer 2, and monomer 3, where monomer 1 has a structure of formula 1, monomer 2 has a structure of formula 2, and monomer 3 has a structure of formula 3, formula 1

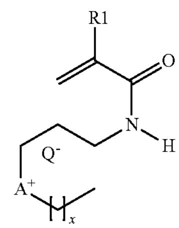

formula 2

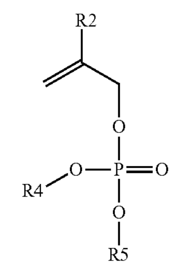

formula 3

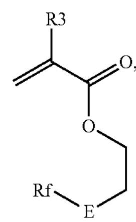

where

R1 and R3 are each independently selected from hydrogen or $C_{1-10}$ alkyl;

R4 is selected from $C_{1-10}$ hydrocarbyl or $C_{1-10}$ hydrocarbyl containing one or more elements of fluorine, chlorine, bromine, iodine, nitrogen, oxygen, sulfur, silicon, boron, and phosphorus;

R2 and R5 are each independently selected from hydrogen, $C_{1-10}$ hydrocarbyl, or hydrocarbyl containing one or more elements of fluorine, chlorine, bromine, iodine, nitrogen, oxygen, sulfur, silicon, boron, and phosphorus, having a carbon atom count of less than or equal to 10, and containing C═C or C≡C;

Rf is selected from hydrogen, or ethoxy segment containing one or more elements of fluorine, chlorine, bromine, iodine, nitrogen, oxygen, sulfur, silicon, boron, and phosphorus and having a carbon atom count of less than or equal to 16;

x is the number of repeating units of methylene, and $0 \le x \le 20$;

$A^+$ is selected from one of functional groups with nitrogen, sulfur, or phosphorus as a cationic center;

$Q^-$ is one, two or more anions selected from halide ion, haloborate, halo(oxalate) borate, perhalate, halophosphate, and halosulfonimide, and optionally $Q^-$ is one, two or more anions selected from chloride ion, tetrafluoroborate, difluorooxalate borate, perchlorate, hexafluorophosphate, and bis(fluorosulfonyl)imide; and E is selected from structures of (1) to (3):

(1)

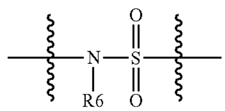

(2)

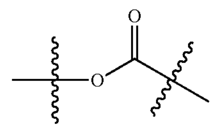

(3)

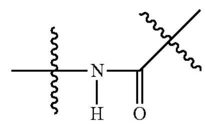

where R6 is selected from hydrogen or $C_{1-10}$ alkyl.

The polymer provided in this application is obtained by polymerizing three monomers (monomer 1, monomer 2, and monomer 3). It uses ethyl as a main chain, and contains an ionic group (from monomer 1), amide (from monomer 1), phosphate ester (from monomer 2), fluoroethoxy (from monomer 3), and other functional groups in its molecular structure. These functional groups provide different functions to the polymer. It is believed that, for example, the presence of the ionic group and element fluorine (mainly from monomer 3) helps to improve the oxidation resistance or high-voltage stability (especially high voltage above 5 V) of the material. When the polymer is used as an electrolyte film material in a secondary battery, a side chain of the flexible ethoxy in the polymer can facilitate migration of lithium ions, and a cationic center of the ionic group can interact with an anion in a lithium salt to improve the lithium ion transference number. The synergistic effect of the phosphate ester group from monomer 2 and the element fluorine (mainly from monomer 3) enables an electrolyte containing the polymer to exhibit excellent flame retardancy, which can improve the safety of lithium secondary batteries when used in the batteries. The amide from monomer 1 provides strong hydrogen bonding association between polymer molecules, and the presence of this strong hydrogen bonding association as well as the construction of a cross-linked network centered on the phosphate ester (from monomer 2) helps to improve the mechanical performance of the polymer material.

Optionally, the polymer has a triblock structure. The triblock structure of the polymer can block contact between side chains of ethoxy, reduce crystallinity of the polymer material, and improve ionic conductivity when used in an electrolyte film.

In any embodiment, in the Rf group, a fluorine substitution rate is greater than 29.0%, and the fluorine substitution rate is a percentage of the number of fluorine atoms based on the number of hydrogen atoms capable of being substituted in the Rf group.

The "number of hydrogen atoms capable of being substituted" should be understood as the number of substitutable sites in the Rf group, that is, the maximum number of hydrogen atoms that can be connected to the carbon atom present, phosphorus atom possibly present, nitrogen atom possibly present, sulfur atom possibly present in the group. If the hydrogen atom has already been substituted by another element, such as halogen atom, the number of substitutable hydrogen atoms is calculated as the sum of the number of hydrogen atoms and the number of other substituent atoms.

A fluorine substitution rate greater than or equal to 29.0% can ensure good flame retardant performance of the polymer and improve the high-voltage stability and high-voltage cyclicity of batteries made of the polymer.

In any embodiment, in the polymer, the cation $A^+$ is selected from one of structural formulas (4) to (6):

(4)

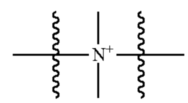

(5)

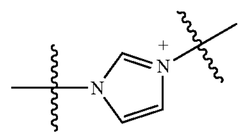

(6)

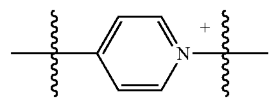

In any embodiment, in the polymer, a molar percentage range of monomer 1 is 3.7-92.6 mol %, a molar percentage range of monomer 2 is 2.0-33.3 mol %, and a molar percentage range of monomer 3 is 3.7-92.6 mol %, all of which are based on the total number of moles of monomer 1, monomer 2, and monomer 3, optionally, a molar percentage of monomer 1 to monomer 2 is in a range of 1:1 to 25:1; and more optionally, a molar percentage of monomer 3 to monomer 2 is in a range of 1:1 to 25:1.

In any embodiment, thermal conductivity of the polymer is in a range of 0.06-0.35 W/m K, and a flame retardant grade thereof is 94V-0 or 94V-1.

A second aspect of this application provides a method of preparing the polymer according to the first aspect of this application, which includes the following steps: dissolving monomer 1, monomer 2, monomer 3, and an initiator in a solvent for reaction in vacuum at 30-100° C. for 0.2-24 h, optionally 6-24 h, and then performing drying. The polymer is formed by block copolymerization. Optionally, the drying is performed in vacuum at 25-140° C. for 1-48 h. The main purpose of drying is to remove the residual solvent after reaction.

A third aspect of this application provides a polymer electrolyte film including the polymer according to the first aspect of this application or a polymer prepared by using the method according to the second aspect of this application.

In any embodiment, the polymer electrolyte film further includes a second polymer, where the second polymer is dispersed in the polymer to form an interpenetrating network structure, and the second polymer is formed by monomer 4, where a general structure of monomer 4 is as follows:

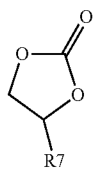

where

R7 is selected from hydrogen, or hydrocarbyl with a carbon atom count of less than 7 that is unsubstituted or substituted by one or more elements of fluorine, bromine, iodine, nitrogen, oxygen, sulfur, silicon, boron, and phosphorus.

As described above, "hydrocarbyl with a carbon atom count of less than 7" includes but is not limited to alkyl with a carbon atom count of less than 7, such as methyl, ethyl, propyl, butyl, pentyl, hexyl, heptyl, octyl, isopropyl, isobutyl, tert-butyl, isopentyl, tert-pentyl, neopentyl, 2-methylpentyl, 3-methylpentyl, 2,2-dimethylbutyl, and 2,3-dimethylbutyl; alkenyl with a carbon atom count of less than 7, such as ethylene, propylene, butene, butadiene, pentene, pentadiene, hexene, and hexadiene; and alkynyl with a carbon atom count of less than 7, such as acetylene, propyne, butyne, pentyne, and hexynyl. Hydrocarbyl with a carbon atom count of less than 7 not capable of being unsubstituted or capable of being substituted by one or more elements of fluorine, bromine, iodine, nitrogen, oxygen, sulfur, silicon, boron, and phosphorus.

In this application, the second polymer is relative to the foregoing polymer, and the purpose is to distinguish it from the foregoing polymer.

The second polymer in this application is an oligomer, with carbonate as a main chain, has a number-average molecular weight Mn of less than 2000 Da, and has a viscosity of less than 3000 cP, allowing it to have a certain degree of fluidity. The second polymer can also be referred to as a carbonate polymer. The oligomer is uniformly dispersed as a second polymer network within the foregoing polymer network, and the presence of the carbonate main chain in the second polymer network guarantees the high-voltage stability of the electrolyte film formed and contributes to the excellent high-voltage resistance of secondary batteries containing the electrolyte film. The second polymer in the interpenetrating network structure has a certain degree of fluidity, and therefore can serve to infiltrate an electrode plate, thereby improving interface contact between the electrolyte film and positive and negative electrodes. Therefore, in the solid-state electrolyte film including an interpenetrating network of a network formed by the polymer and a network formed by the second polymer, the introduction of the second polymer network with fluidity not only improves the infiltration performance between the electrolyte film and the electrodes, improving interface contact between the electrolyte film and the positive and negative electrodes, but also ensures high ionic conductivity of the electrolyte film because segmental motion of the carbonate chain can facilitate lithium ion migration.

In some optional embodiments, the electrolyte film containing the foregoing interpenetrating network structure in this application is suitable for a high-voltage battery system, such as a 5 V high-voltage battery system. The high-voltage battery system includes but is not limited to $LiNi_{0.8}CO_{0.1}Mn_{0.1}O_2$, $LiCoO_2$, $LiMn_2O_4$, $LiNiCoAlO_2$, $LiNi_{0.5}Mn_{1.5}O_4$, and other battery systems.

Optionally, in the interpenetrating network structure, a mass ratio of the polymer to the second polymer is 20:1 to 2:1.

In any embodiment, the polymer electrolyte film further includes a lithium salt, where the lithium salt is selected from one or more of lithium hexafluorophosphate ($LiPF_6$), lithium tetrafluoroborate ($LiBF_4$), lithium bis(fluorosulfonyl)imide (LiFSI), lithium bis(trifluoromethanesulfonyl)imide (LiTFSI), lithium difluorooxalate borate (LiDFOB), lithium perchlorate ($LiClO_4$), lithium bis(oxalate) borate (LiBOB).

The type of the lithium salt affects the lithium ion transference number of the polymer electrolyte film prepared. Due to their different structures, different lithium salts have different degrees of dissociation between anions and cations. A lithium salt with a high dissociation degree can provide more charge carriers, and the concentration of $Li^+$ affects a "coordination-dissociation" process between $Li^+$ and an ether oxygen atom or carbonyl in a polymer chain, thereby affecting the migration capability of $Li^+$ and anions in batteries in a charge and discharge processes. Generally, PEO-based electrolytes have a transference number of less than 0.2 due to multidentate ligand chelation between ether oxygen atom and Lit, and the relatively weak solvation effect between ether oxygen atom and TFSI-anion.

In any embodiment, a mass percentage of the lithium salt in the polymer electrolyte film is in a range of 6.8-30.0% based on a total mass of the polymer electrolyte film.

In any embodiment, a percentage of element fluorine in the polymer electrolyte film is in a range of 12.5-46.0% based on a total weight of the polymer electrolyte film.

To ensure the dual characteristics of high-voltage resistance and flame retardancy for the electrolyte film prepared by using the polymer, the fluorine substitution rate in the Rf group of the polymer is optimally maintained to be greater than or equal to 29.0%. In the polymer electrolyte film prepared by using the polymer, the percentage of element fluorine is finally controlled within the foregoing range, which is more conducive to achieving the high-voltage resistance and flame retardant performance of the electrolyte film.

A third aspect of this application provides a method of preparing a polymer electrolyte film including the following step:

making monomer 1, monomer 2, monomer 3 in this application, monomer 4 in this application, the lithium salt in this application, an optional catalyst, and an initiator react at 30-100° C. for 0.2-24 h to obtain product 1.

It is believed that in this step, monomer 1, monomer 2, and monomer 3 undergo block copolymerization in the presence of the initiator to form the polymer, and monomer 4 undergoes ionic copolymerization in the presence of the lithium salt and the optional catalyst to form a fluid second polymer.

In any embodiment, the method of preparing a polymer electrolyte film further includes a step of performing anion exchange on the obtained product 1 with a lithium salt solution to obtain product 2.

After the anion exchange, an intrinsic anion Q in the ionic group of the polymer formed, for example, $Cl^-$ which can corrode aluminum foil, can be replaced with a target anion, optionally, replaced with an anion of the same type as an anion in the lithium salt. This not only prevents some side reactions but also regulates the binding capability between the anion and the polymer or a lithium ion.

In any embodiment, the method of preparing a polymer electrolyte film according to this application further includes: drying product 2 obtained.

The purpose of drying is to remove the residual solvent. Any conventional means in the field can be used for the drying, as long as the purpose of removing the solvent is achieved without degrading the electrolyte film. Drying can be performed by using a vacuum drying oven.

In any embodiment, in the method of preparing the polymer electrolyte film according to this application, a ratio of a total mass of monomer 1, monomer 2, and monomer 3 to a mass of monomer 4 is in a range of 20:1 to 2:1.

In any embodiment, in the method of preparing the polymer electrolyte film according to this application, a ratio of a total mass of monomer 1, monomer 2, monomer 3, and monomer 4 to a mass of the lithium salt is in a range of 2.3 to 13.6.

In any embodiment, in the method of preparing the polymer electrolyte film according to this application, a weight ratio of the lithium salt to the initiator is in a range of 5:1 to 60:1; and if the catalyst is used, a ratio of a total weight of the lithium salt and catalyst to a weight of the initiator is in a range of 7:1 to 80:1.

The initiator can be used to initiate block copolymerization of the polymer in this application, and the lithium salt and the catalyst can be used to initiate ionic polymerization of the second polymer. The ratio of the two can reflect the distribution of the two prepared polymers and structural composition of the interpenetrating network to some extent.

It is believed that the polymer in this application is prepared through block copolymerization initiated by the initiator. The second polymer is prepared through ionic polymerization catalyzed by the lithium salt and the optional catalyst. Although monomers of the two polymers are mixed together, the polymers are prepared separately without interfering with each other. Moreover, since the monomers, initiator, and optional catalyst are mixed to uniformity in the solvent before the polymerization, the interpenetrating network structure where the polymer network and the second polymer network uniformly penetrate into each other is obtained after complete polymerization, and the lithium salt is uniformly dispersed in this structure.

Optionally, in any embodiment, this application provides a solid-state electrolyte film prepared by using the foregoing method of preparing a solid polymer electrolyte film.

A fifth aspect of this application provides a secondary battery including a positive electrode and a negative electrode, and further including the polymer electrolyte film according to the third aspect of this application or a polymer electrolyte film prepared by using the method according to the fourth aspect of this application. The secondary battery, battery module, battery pack, and electric apparatus of this application are described below.

In any embodiment, the positive electrode includes a positive electrode current collector and a positive electrode film layer, where the positive electrode film layer includes a positive electrode active material, the foregoing second polymer, and the foregoing lithium salt. Optionally, a mass percentage of the second polymer in the positive electrode film layer is 2-15%, and optionally, a mass percentage of the lithium salt in the positive electrode film layer is 0.5-10%.

Using the second polymer in the positive electrode film has the following advantages: internal pores of the positive electrode film are filled with the fluid second polymer and the lithium salt, and the fluid second polymer not only infiltrates the interior of the electrode plate, but further provides a channel for lithium ion transport within the plate through its segmental motion, thereby enhancing ion transport within the positive electrode film.

In any embodiment, in the secondary battery, the negative electrode includes a negative electrode current collector and a metal sheet made of lithium metal or lithium alloy.

The polymer electrolyte film in this application is suitable to be used together with a lithium metal negative electrode with a high specific capacity (3860 mAh/g) and a very low potential (−3.04 V vs. $H_2/H^+$) or a lithium alloy negative electrode, or to be used without any negative electrode. Optionally, a thickness of the negative electrode plate is 9-50 μm.

The lithium alloy includes but is not limited to lithium-aluminum alloy, lithium-magnesium alloy, lithium-boron alloy, and the like.

In any embodiment, in the secondary battery, a thickness of the polymer electrolyte film is 10-1000 μm.

A sixth aspect of this application provides a battery module including the secondary battery according to the fifth aspect of this application.

A seventh aspect of this application provides a battery pack including the battery module according to the sixth aspect of this application.

An eighth aspect of this application provides an electric apparatus including at least one of the secondary battery according to the fifth aspect of this application, the battery module according to the sixth aspect of this application, or the battery pack according to the seventh aspect of this application.

DESCRIPTION OF REFERENCE SIGNS

Figure 1:
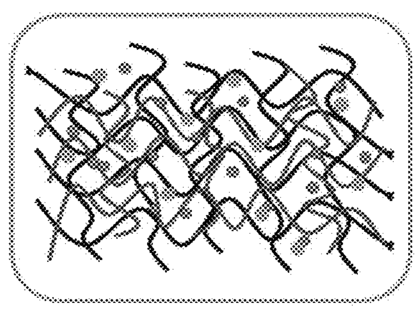
FIG. 1 is a schematic diagram of an interpenetrating network structure of a polymer in this application and a second polymer, where dots represent a lithium salt, and two different irregular lines represent the polymer and the second polymer respectively.

1. battery pack; 2. upper box body; 3. lower box body; 4. battery module; 5. secondary battery; 51. housing; 52. electrode assembly; and 53. cover plate.

DESCRIPTION OF EMBODIMENTS

The following specifically discloses embodiments of a polymer, a polymer electrolyte film, and a lithium battery and a manufacturing method thereof of this application with appropriate reference to detailed descriptions of accompanying drawings. However, there may be cases where unnecessary detailed descriptions are omitted. For example, detailed descriptions of well-known matters and repeated descriptions of actually identical structures have been omitted. This is to avoid unnecessarily prolonging the following description, for ease of understanding by persons skilled in the art. In addition, the accompanying drawings and the following descriptions are provided for persons skilled in the art to fully understand this application and are not intended to limit the subject matter recorded in the claims.

"Ranges" disclosed in this application are defined in the form of lower and upper limits. A given range is defined by one lower limit and one upper limit selected, where the selected lower and upper limits define boundaries of that particular range. Ranges defined in this method may or may not include end values, and any combinations may be used, meaning any lower limit may be combined with any upper limit to form a range. For example, if ranges of 60-120 and 80-110 are provided for a specific parameter, it is understood that ranges of 60-110 and 80-120 can also be envisioned. In addition, if minimum values of a range are given as 1 and 2, and maximum values of the range are given as 3, 4, and 5, the following ranges can all be envisioned: 1-3, 1-4, 1-5, 2-3, 2-4, and 2-6. In this application, unless otherwise stated, a value range of "a-b" is a short representation of any combination of real numbers between a and b, where both a and b are real numbers. For example, a value range of "0-5" means that all real numbers in the range of "0-5" are listed herein, and "0-5" is just a short representation of a combination of these values. In addition, a parameter expressed as an integer greater than or equal to 2 is equivalent to disclosure that the parameter is, for example, an integer among 2, 3, 4, 5, 6, 7, 8, 9, 10, 11, 12, and so on. In the specification, when representing a range, "to" and "–" have the same meaning.

Unless otherwise specified, all the embodiments and optional embodiments of this application can be combined with each other to form new technical solutions.

Unless otherwise specified, all the technical features and optional technical features of this application can be combined with each other to form new technical solutions.

Unless otherwise specified, all the steps in this application can be performed in the order described or in random order, preferably, in the order described. For example, a method including steps (a) and (b) indicates that the method may include steps (a) and (b) performed in order or may include steps (b) and (a) performed in order. For example, the foregoing method may further include step (c), which indicates that step (c) may be added to the method in any ordinal position, for example, the method may include steps (a), (b), and (c), steps (a), (c), and (b), steps (c), (a), and (b), or the like.

Unless otherwise specified, "include" and "contain" mentioned in this application are inclusive or may be exclusive. For example, the terms "include" and "contain" can mean that other unlisted components may also be included or contained, or only listed components are included or contained.

Unless otherwise specified, in this application, the term "or" is inclusive. For example, the phrase "A or B" means "A, B, or both A and B". More specifically, any one of the following conditions satisfies the condition "A or B": A is true (or present) and B is false (or not present); A is false (or not present) and B is true (or present); or both A and B are true (or present).

Solid state batteries can be classified into four categories by solid-state electrolyte chemistry system: polymer type, sulfide type, oxide type, and chloride type. Polymer solid-state electrolytes represented by polyethylene oxide (PEO) systems were the first to achieve commercial application in the 1990s due to their characteristics of good interface infiltration, excellent processing performance, lightweight, and low density, and the advantages of low costs. However, the voltage window of most such polymer electrolytes is relatively low (for example, PEO: 3.9 V), and is difficult to match high-voltage positive electrodes. This greatly limits improvement in energy density of batteries, and the flammability of polymers cannot meet the high safety requirements of next-generation batteries either.

Currently, an instance of high-voltage resistant solid-state electrolyte films is films prepared by using a modified aluminum-based polymer. The electrolyte film is prepared by mixing a modified aluminum-based polymer, a branched polymer, and an electrolyte to uniformity, adding a photoinitiator, and cross-linking these substances under a stirring condition. A secondary battery with the electrolyte film has high conductivity and can achieve stable cycling at 4.2 V. Moreover, as a cross-linked structure, the polymer can provide high mechanical strength for the solid-state electrolyte film and reduce dendrites generated, thereby improving safety and the like of lithium metal secondary batteries. However, the modified aluminum-based polymer film has polyester as its main structure, and is not high-voltage resistant itself and therefore has limited improvement in high-voltage stability after aluminumization. Secondly, the modified aluminum-based polymer film contains an inorganic component and is a cross-linked structure. Although the mechanical performance is improved, this affects interface contact between a solid-state electrolyte film prepared from the modified aluminum-based polymer film and positive and negative electrodes. In addition, the solid-state electrolyte film focuses only on the characteristic of high-voltage resistance, and does not take into account the flame retardance and other safety performance of the material itself.

Surprisingly, this application provides a new polymer that inherently has good flame retardant performance and can form an interpenetrating network structure with other polymers. Using the polymer of such structure as an electrolyte film can provide better mechanical strength, and secondary batteries prepared with this electrolyte film exhibit better safety performance, better high-voltage stability, and better high-voltage cycling performance, and can achieve better interface contact between the electrolyte film and positive and negative electrodes.

Therefore, a first aspect of this application provides a polymer obtained by polymerizing monomer 1, monomer 2, and monomer 3, where monomer 1 has a structure of formula 1, monomer 2 has a structure of formula 2, and monomer 3 has a structure of formula 3, formula 1

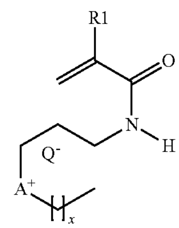

-continued formula 2

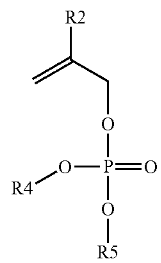

formula 3

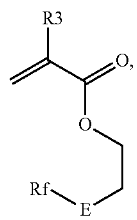

where

R1 and R3 are each independently selected from hydrogen or $C_{1-10}$ alkyl;

R4 is selected from $C_{1-10}$ hydrocarbyl or $C_{1-10}$ hydrocarbyl containing one or more elements of fluorine, chlorine, bromine, iodine, nitrogen, oxygen, sulfur, silicon, boron, and phosphorus;

R2 and R5 are each independently selected from hydrogen, $C_{1-10}$ hydrocarbyl, or hydrocarbyl containing one or more elements of fluorine, chlorine, bromine, iodine, nitrogen, oxygen, sulfur, silicon, boron, and phosphorus, having a carbon atom count of less than or equal to 10, and containing C═C or C≡C;

Rf is selected from hydrogen, or ethoxy segment containing one or more elements of fluorine, chlorine, bromine, iodine, nitrogen, oxygen, sulfur, silicon, boron, and phosphorus and having a carbon atom count of less than or equal to 16;

x is the number of repeating units of methylene, and $0 \leq x \leq 20$;

$A^+$ is selected from one of functional groups with nitrogen, sulfur, or phosphorus as a cationic center;

$Q^-$ is one, two or more anions selected from halide ion, haloborate, halo(oxalate) borate, perhalate, halophosphate, and halosulfonimide, and optionally $Q^-$ is one, two or more anions selected from chloride ion, tetrafluoroborate, difluorooxalate borate, perchlorate, hexafluorophosphate, and bis(fluorosulfonyl)imide; and E is selected from structures of (1) to (3):

(1)

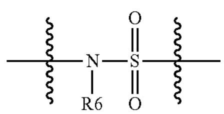

(2)

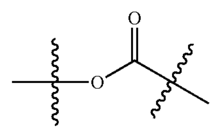

-continued (3)

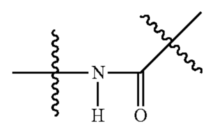

where R6 is selected from hydrogen or $C_{1-10}$ alkyl.

In this application, the $C_{1-10}$ alkyl is straight-chain or branched-chain alkyl containing 1-10 carbons, and includes but is not limited to, for example, methyl, ethyl, propyl, butyl, pentyl, hexyl, heptyl, octyl, isopropyl, isobutyl, tert-butyl, isopentyl, tert-pentyl, neopentyl, 2-methylpentyl, 3-methylpentyl, 2,2-dimethylbutyl, 2,3-dimethyl butyl, 2-methylhexyl, 3-methylhexyl, 2,2-dimethylpentyl, 3,3-dimethylpentyl, 2,3-dimethylpentyl, 2,4-dimethylpentyl, 3-ethylpentyl, 2,2,3-trimethylbutyl, 2-methylheptyl, 3-methylheptyl, 4-methylheptyl, 2,2-dimethylhexane, 3,3-dimethylhexane, 2,3-dimethylhexane, 2,4-dimethylhexane, 2,5-dimethylhexane, 3,4-dimethylhexane, 3-ethylhexane, 2,2,3-trimethylpentane, 2,2,4-trimethylpentane, 2,3,3-trimethylpentane, 2,3,4-trimethylpentane, 2-methyl-3-ethyl-pentane, 3-methyl-3-ethyl-pentane, and 2,2,3,3-tetramethylbutane, nonyl, and decyl.

In this application, $C_{1-10}$ hydrocarbyl can include the foregoing $C_{1-10}$ alkyl, $C_{6-10}$ aryl, straight-chain or branched-chain $C_{2-10}$ alkenyl, straight-chain or branched-chain $C_{2-10}$ alkynyl, and the like. $C_{6-10}$ aryl can be, for example, phenyl, naphthyl, or $C_{1-4}$ alkyl-substituted phenyl. $C_{2-10}$ alkenyl can be, for example, vinyl, propenyl, allyl, butenyl, butadienyl, pentenyl, pentadienyl, and hexenyl. $C_{2-10}$ alkynyl can be, for example, ethynyl, propynyl, butynyl, butadiynyl, pentynyl, pentadiynyl, and hexynyl.

In this application, in the definition of the R4 group of monomer 2, "$C_{1-10}$ hydrocarbyl containing one or more elements of fluorine, chlorine, bromine, iodine, nitrogen, oxygen, sulfur, silicon, boron, and phosphorus" can be straight-chained or branch-chained, singly or multiply substituted, saturated or unsaturated. "Containing one or more elements of fluorine, chlorine, bromine, iodine, nitrogen, oxygen, sulfur, silicon, boron, and phosphorus" means containing these elements such as but not limited to fluorine, chlorine, bromine, iodine through substitution, or containing these elements for example but not limited to nitrogen, oxygen, sulfur, silicon, boron, phosphorus through other manners. For example, these elements are used as a component of a group or a main structure of structural formula, as long as it is chemically feasible. For example, the R4 group can be phenyl, vinyl, propenyl, allyl, pyridyl, pyrimidinyl, or the like.

In this application, in the definition of the R2 and R5 groups of monomer 2, "hydrocarbyl containing one or more elements of fluorine, chlorine, bromine, iodine, nitrogen, oxygen, sulfur, silicon, boron, and phosphorus, having a carbon atom count of less than or equal to 10, and containing C═C or C≡C" can alternatively be expressed as $C_{2-10}$ alkenyl or $C_{2-10}$ alkynyl containing one or more elements of fluorine, chlorine, bromine, iodine, nitrogen, oxygen, sulfur, silicon, boron, and phosphorus, and can be straight-chained or branch-chained, singly or multiply substituted. As described above, $C_{2-10}$ alkenyl can be, for example, vinyl, propenyl, butenyl, butadienyl, pentenyl, pentadienyl, hexenyl, etc.; $C_{2-10}$ alkynyl can be, for example, ethynyl, propynyl, butynyl, butadiynyl, pentynyl, pentadiynyl, and hexynyl. "Containing one or more elements of fluorine, chlorine, bromine, iodine, nitrogen, oxygen, sulfur, silicon, boron, and phosphorus" means containing these elements such as but not limited to fluorine, chlorine, bromine, iodine through substitution, or containing these elements for example but not limited to nitrogen, oxygen, sulfur, silicon, boron, phosphorus through other manners. For example, these elements are used as a component of a group or a main structure of structural formula, as long as it is chemically feasible. For example, R2 and R5 can be hydrogen, vinyl, propenyl, allyl, and the like.

In this application, in the definition of the Rf group of monomer 3, "ethoxy segment containing one or more elements of fluorine, chlorine, bromine, iodine, nitrogen, oxygen, sulfur, silicon, boron, and phosphorus and having a carbon atom count of less than or equal to 16" indicates that the group has 1 to 8 ethoxy segments and contains one or more elements of fluorine, chlorine, bromine, iodine, nitrogen, oxygen, sulfur, silicon, boron, and phosphorus. "Containing one or more elements of fluorine, chlorine, bromine, iodine, nitrogen, oxygen, sulfur, silicon, boron, and phosphorus" means containing these elements such as but not limited to fluorine, chlorine, bromine, iodine through substitution, or containing these elements for example but not limited to nitrogen, oxygen, sulfur, silicon, boron, phosphorus through other manners. For example, these elements are used as a component of a group or a main structure of structural formula, as long as it is chemically feasible. The 1 to 8 ethoxy segments can alternatively be substituted by branched-chain or straight-chain $C_{1-10}$ alkyl or haloalkyl. For example, the ethoxy segment containing one or more elements of fluorine, chlorine, bromine, iodine, nitrogen, oxygen, sulfur, silicon, boron, and phosphorus and having a carbon atom count of less than or equal to 16 can be an ethoxy segment connected to cyclotriphosphazene, or an ethoxy segment substituted by one or more elements of fluorine, chlorine, bromine, iodine, nitrogen, oxygen, sulfur, silicon, boron, and phosphorus.

In this application, in the definition of $A^+$, the "functional group with nitrogen, sulfur, or phosphorus as a cationic center" indicates that the functional group contains nitrogen, sulfur, or phosphorus, and that the nitrogen, sulfur, or phosphorus is the cationic center. Optionally, $A^+$ is a functional group containing a nitrogen-based cation, and more optionally, is selected from ammonium cation, imidazolium cation, and pyridinium cation. Most optionally, $A^+$ is $-N(R')_2^+-$

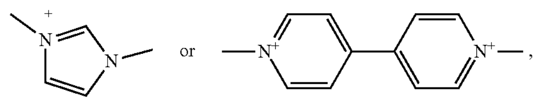

or , where R' is independently selected from hydrogen or $C_{1-10}$ alkyl.

In this application, Q is defined as one, two, or more anions selected from halide ion, haloborate, halo(oxalate) borate, perhalate, halophosphate, and halosulfonimide. The number of anions depends on the number of cations in $A^+$. For example, under a condition that the $A^+$ group carries two positive charges, Q can be two monovalent anions. The number of ions in $A^+$ or $Q^-$ is not specifically limited, as long as it is chemically feasible.

In this application, the halide ion can be fluoride ion, chloride ion, bromide ion, or iodide ion. The halogenation may be fluorination, chlorination, bromination, or iodination, optionally fluorination, and the halogenation may be mono-substitution, di-substitution, or multi-substitution. The perhalate may be perfluorate, perchlorate, perbromate, or periodate.

The polymer provided in this application is obtained by polymerizing three monomers (monomer 1, monomer 2, and monomer 3). It uses ethyl as a main chain, and contains an ionic group (from monomer 1), amide (from monomer 1), phosphate ester (from monomer 2), fluoroethoxy (from monomer 3), and other functional groups in its molecular structure. These functional groups provide different functions to the polymer. It is believed that, for example, the presence of the ionic group and element fluorine (mainly from monomer 3) helps to improve the oxidation resistance or high-voltage stability (especially high voltage above 5 V) of the material. When the polymer is used as an electrolyte film material in a secondary battery, a side chain of the flexible ethoxy in the polymer can facilitate migration of lithium ions, and a cationic center of the ionic group can interact with an anion in a lithium salt to improve the lithium ion transference number. The synergistic effect of the phosphate ester group from monomer 2 and the element fluorine (mainly from monomer 3) enables an electrolyte containing the polymer to exhibit excellent flame retardancy, which can improve the safety of lithium secondary batteries when used in the batteries. The amide from monomer 1 provides strong hydrogen bonding association between polymer molecules, and the presence of this strong hydrogen bonding association as well as the construction of a cross-linked network centered on the phosphate ester (from monomer 2) helps to improve the mechanical performance of the polymer material.

The polymer in this application can be a random triblock copolymer. In some embodiments, the polymer in this application has the following structural formula:

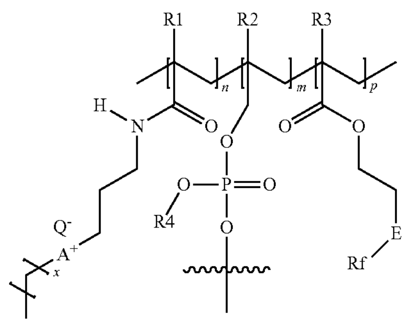

formula 4, where R1, R2, R3, R4, Rf, E, $A^+$, $Q^-$, and x are as defined above, and n, m, and p are the numbers of repeating units, where $0<n\leq5000$, $0<m\leq1000$, $0<p\leq5000$, a ratio nim of n to m is in a range of 1:1 to 25:1, and a ratio p:m of p to m is in a range of 1:1 to 25:1, and the tilde represents a cross-linking point between one polymer molecule of formula 4 and another polymer molecule of formula 4.

Optionally, the polymer has a triblock structure. The triblock structure of the polymer can block contact between side chains of ethoxy, reduce crystallinity of the polymer material, and improve ionic conductivity when used in an electrolyte film.

In some embodiments, in the Rf group, a fluorine substitution rate is greater than 29.0%, and the fluorine substitution rate is a percentage of the number of fluorine atoms based on the number of hydrogen atoms that is capable of being substituted in the Rf group.

The "number of hydrogen atoms capable of being substituted" should be understood as the number of substitutable sites in the Rf group, that is, the maximum number of hydrogen atoms that can be connected to the carbon atom present, phosphorus atom possibly present, nitrogen atom possibly present, sulfur atom possibly present in the group. If the hydrogen atom has already been substituted by another element, such as halogen atom, the number of substitutable hydrogen atoms is calculated as the sum of the number of hydrogen atoms and the number of other substituent atoms.

A fluorine substitution rate greater than or equal to 29.0% can ensure good flame retardant performance of the polymer and improve the high-voltage stability and high-voltage cyclicity of batteries made of the polymer.

In some embodiments, in the polymer, the cation $A^+$ is selected from one of structural formulas (4) to (6):

(4)

(5)

(6)

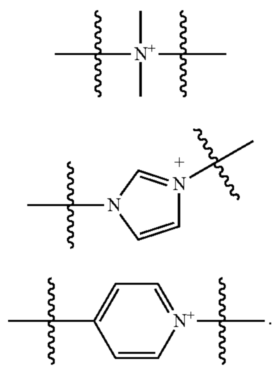

In some embodiments, in the polymer, a molar percentage range of monomer 1 is 3.7-92.6 mol %, a molar percentage range of monomer 2 is 2.0-33.3 mol %, and a molar percentage range of monomer 3 is 3.7-92.6 mol %, all of which are based on the total number of moles of monomer 1, monomer 2, and monomer 3, optionally, a molar percentage of monomer 1 to monomer 2 is in a range of 1:1 to 25:1; and more optionally, a molar percentage of monomer 3 to monomer 2 is in a range of 1:1 to 25:1.

In some embodiments, thermal conductivity of the polymer is in a range of 0.06-0.35 W/m K, and a flame retardant grade thereof is 94V-0 or 94V-1.

The thermal conductivity of the polymer and electrolyte film can be determined according to GBT 10294-2008.

The flame retardant grades of the polymer and electrolyte film can be determined according to the UL94 vertical burning test of ASTM D3801.

A second aspect of this application provides a method of preparing the polymer according to the first aspect of this application, which includes the following steps: dissolving monomer 1, monomer 2, monomer 3, and an initiator in a solvent for reaction in vacuum at 30-100° C. for 0.2-24 h, optionally 6-24 h, and then performing drying. The polymer is formed by block copolymerization. Optionally, the drying is performed in vacuum at 25-140° C. for 1-48 h. The main purpose of drying is to remove the residual solvent after reaction.

A third aspect of this application provides a polymer electrolyte film including the polymer according to the first aspect of this application or a polymer prepared by using the method according to the second aspect of this application.

In some embodiments, the polymer electrolyte film further includes a second polymer, where the second polymer is dispersed in the polymer to form an interpenetrating network structure, and the second polymer is formed by monomer 4, where a general structure of monomer 4 is as follows:

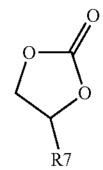

where

R7 is selected from hydrogen, or hydrocarbyl with a carbon atom count of less than 7 that is unsubstituted or substituted by one or more elements of fluorine, bromine, iodine, nitrogen, oxygen, sulfur, silicon, boron, and phosphorus.

As described above, "hydrocarbyl with a carbon atom count of less than 7" includes but is not limited to alkyl with a carbon atom count of less than 7, such as methyl, ethyl, propyl, butyl, pentyl, hexyl, heptyl, octyl, isopropyl, isobutyl, tert-butyl, isopentyl, tert-pentyl, neopentyl, 2-methylpentyl, 3-methylpentyl, 2,2-dimethylbutyl, and 2,3-dimethylbutyl; alkenyl with a carbon atom count of less than 7, such as ethylene, propylene, butene, butadiene, pentene, pentadiene, hexene, and hexadiene; and alkynyl with a carbon atom count of less than 7, such as acetylene, propyne, butyne, pentyne, and hexynyl. Hydrocarbyl with a carbon atom count of less than 7 not capable of being unsubstituted or capable of being substituted by one or more elements of fluorine, bromine, iodine, nitrogen, oxygen, sulfur, silicon, boron, and phosphorus.

In this application, the second polymer is relative to the foregoing polymer, and the purpose is to distinguish it from the foregoing polymer.

The polymer in this application can form an interpenetrating network structure with another polymer, optionally a polymer with fluidity, to obtain a polymer with higher mechanical strength. Optionally, the second polymer is uniformly dispersed in the polymer to form an interpenetrating network structure. FIG. 1 is a schematic diagram of the interpenetrating network of the polymer and the second polymer.

The interpenetrating network structure is a special type of blend and also referred to as an interpenetrating polymer network (interpenetrating polymer network, IPN for short).

In a solid-state electrolyte film including an interpenetrating network structure formed by a polymer network and a second polymer network, due to the presence of an ionic group and element fluorine in the polymer network, the high-voltage stability of the electrolyte film can be effectively improved, and the electrolyte film exhibits a wider electrochemical window, making it suitable for high-voltage battery systems. For example, it can exhibit good cycling stability in NCM811/Li batteries. Additionally, due to the synergistic effect of the phosphate ester group and element fluorine in the polymer network, the polymer electrolyte film exhibits excellent flame retardancy, enhancing the safety of lithium metal battery. Furthermore, the flexible ethoxy segment in the polymer network can facilitate lithium ion migration, and an ionic group with nitrogen, phosphorus, or sulfur as a cationic center can interact with an anion in the lithium salt to restrict the movement, thereby increasing the lithium ion transference number. The strong hydrogen bonding association between amide molecules in the polymer network and the construction of a cross-linked network centered on phosphate ester are beneficial for enhancing the mechanical performance of the material. In addition, the triblock structure of the polymer can reduce the crystallinity of the material by blocking the contact between ethoxy side chains, thereby improving the ionic conductivity of the electrolyte film.

It should be understood that the description of the polymer also applies to the polymer in the interpenetrating network or electrolyte film.

The second polymer in this application is an oligomer, with carbonate as a main chain, has a number-average molecular weight Mn of less than 2000 Da, and has a viscosity of less than 3000 cP, allowing it to have a certain degree of fluidity. The second polymer can also be referred to as a carbonate polymer. The oligomer is uniformly dispersed as a second polymer network within the polymer network. That is, in the foregoing random triblock copolymer, the presence of the carbonate main chain in the second polymer network guarantees the high-voltage stability of the electrolyte film formed and contributes to the excellent high-voltage resistance of secondary batteries containing the electrolyte film. The second polymer in the interpenetrating network structure has a certain degree of fluidity, and therefore can serve to infiltrate the electrode plate, thereby improving interface contact between the electrolyte film and positive and negative electrodes. Therefore, in the solid-state electrolyte film including the interpenetrating network of a network formed by the polymer and a network formed by the second polymer, the introduction of the second polymer network with fluidity not only improves the infiltration performance between the electrolyte film and the electrodes, improving interface contact between the electrolyte film and the positive and negative electrodes, but also ensures high ionic conductivity of the electrolyte film because segmental motion of the carbonate chain can facilitate lithium ion migration.

In some optional embodiments, the electrolyte film containing the foregoing interpenetrating network structure in this application is suitable for a high-voltage battery system, such as a 5 V high-voltage battery system. The high-voltage battery system includes but is not limited to $LiNi_{0.8}Co_{0.1}Mn_{0.1}O_2$, $LiCoO_2$, $LiMn_2O_4$, $LiNiCoAlO_2$, $LiNi_{0.5}Mn_{1.5}O_4$, and other battery systems.

Optionally, in the interpenetrating network structure, a mass ratio of the polymer to the second polymer is 20:1 to 2:1.

In some embodiments, the polymer electrolyte film further includes a lithium salt, where the lithium salt is selected from one or more of lithium hexafluorophosphate ($LiPF_6$), lithium tetrafluoroborate ($LiBF_4$), lithium bis(fluorosulfonyl)imide (LiFSI), lithium bis(trifluoromethanesulfonyl)imide (LiTFSI), lithium difluorooxalate borate (LiDFOB), lithium perchlorate ($LiClO_4$), and lithium bis(oxalate) borate (LiBOB).

The type of the lithium salt affects the lithium ion transference number of the polymer electrolyte film prepared. Due to their different structures, different lithium salts have different degrees of dissociation between anions and cations. A lithium salt with a high dissociation degree can provide more charge carriers, and the concentration of $Li^+$ affects a "coordination-dissociation" process between $Li^+$ and an ether oxygen atom or carbonyl in a polymer chain, thereby affecting the migration capability of $Li^+$ and anions in batteries in a charge and discharge processes. Generally, PEO-based electrolytes have a transference number of less than 0.2 due to multidentate ligand chelation between ether oxygen atom and Lit, and the relatively weak solvation effect between ether oxygen atom and TFSI-anion.

In some embodiments, a mass percentage of the lithium salt in the polymer electrolyte film is in a range of 6.8-30.0% based on a total mass of the polymer electrolyte film.

Optionally, a mass ratio of the interpenetrating network structure to the lithium salt in the polymer electrolyte film can alternatively be expressed as a ratio of a total mass of the polymer and the second polymer to a mass of the lithium salt or a ratio of a total mass of monomers 1 to 4 to a mass of the lithium salt is 2.3 to 13.6.

In some embodiments, a percentage of element fluorine in the polymer electrolyte film is in a range of 12.5-46.0% based on a total weight of the polymer electrolyte film.

To ensure the dual characteristics of high-voltage resistance and flame retardancy for the electrolyte film prepared by using the polymer, the fluorine substitution rate in the Rf group of the polymer is optimally maintained to be greater than or equal to 29.0%. In the polymer electrolyte film prepared by using the polymer, the percentage of element fluorine is finally controlled within the foregoing range, which is more conducive to achieving the high-voltage resistance and flame retardant performance of the electrolyte film.

A third aspect of this application provides a method of preparing a polymer electrolyte film including the following step:

making monomer 1, monomer 2, monomer 3 in this application, monomer 4 in this application, the lithium salt in this application, an optional catalyst, and an initiator react at 30-100° C. for 0.2-24 h to obtain product 1. It is believed that in this step, monomer 1, monomer 2, and monomer 3 undergo block copolymerization in the presence of the initiator to form the polymer, and monomer 4 undergoes ionic copolymerization in the presence of the lithium salt and the optional catalyst to form a fluid second polymer.

The initiator is used to initiate block copolymerization among monomer 1, monomer 2, and monomer 3 to form the polymer in this application. The initiator includes but is not limited to azo or peroxide molecules, such as 2,2'-azobis(2,4-dimethylvaleronitrile), 2,2'-azobis(isobutyronitrile), 2,2'-azobis(methylbutyronitrile), 1,1'-azobis(cyclohexanecarbonitrile), benzoyl peroxide, lauroyl peroxide, di-tert-butyl peroxide, diisopropyl peroxydicarbonate, and dicyclohexyl peroxydicarbonate.

Optionally, the mass of the initiator does not exceed 5% of the total mass of the two polymer monomers and lithium salt (that is, the sum of the masses of monomer 1, monomer 2, monomer 3, monomer 4, and the lithium salt).

The lithium salt is as mentioned above. The lithium salt can be used to catalyze the ionic polymerization of monomer 4 to form the fluid second polymer.

In some cases, using only the lithium salt to catalyze the ionic polymerization of monomer 4 is not sufficient, and a catalyst is also needed. Catalysts that can be used include but are not limited to stannous octoate, aluminum trifluoromethanesulfonate, aluminum trichloride, trimethylsilyl trifluoromethanesulfonate, boron trifluoride diethyl etherate, triethylamine, 1,8-diazabicyclo [5.4.0]undec-7-ene. The catalyst catalyzes polymerization of the second polymer. In this application, the second polymer is obtained through ionic polymerization.

Optionally, in the method of preparing the polymer electrolyte film, monomer 1, monomer 2, monomer 3, monomer 4, the lithium salt, the catalyst, and the initiator are dissolved in a solvent and these substances are stirred or otherwise mixed to obtain a uniform solution.

Optionally, the uniform solution is poured into a commonly used tool in the field (for example, a polytetrafluoroethylene mold), and heated to 30-100° C. for reaction in vacuum for 0.2-24 h. Optionally, the reaction is conducted in a vacuum oven.

In some embodiments, the method of preparing a polymer electrolyte film further includes a step of performing anion exchange on the obtained product 1 with a lithium salt solution to obtain product 2.

As mentioned before, the Q anion is present in monomer 1, and some anions (for example, chloride ion) may be unfavourable to the cell system, for instance, may cause corrosion. Therefore, anion exchange is required. After the anion exchange, an intrinsic anion $Q^-$ in the ionic group of the polymer formed, for example, $Cl^-$ which can corrode aluminum foil, can be replaced with a target anion, optionally, replaced with an anion of the same type as an anion in the lithium salt. This not only prevents some side reactions but also regulates the binding capability between the anion and the polymer or a lithium ion.

Generally, the concentration of anions in the lithium salt solution used for anion exchange needs to be much higher than the concentration of $Q^-$ in the polymer. The concentration of $Q^-$ can be determined using conventional techniques in the field, for example, in the case of $Cl^-$, it can be titrated with silver nitrate in a neutral solution using potassium chromate as an indicator, and the concentration of chloride ions can be calculated based on the volume of silver nitrate solution consumed.

The lithium salt solution is a separately prepared solution, and the lithium salt in the lithium salt solution can be the same or different from the lithium salt in the electrolyte film, with the same type being more favorable. Optionally, the anion exchange is conducted for 1-20 h, and this time is not limiting and can be adjusted based on actual circumstances.

In the anion exchange, the solvent in the lithium salt solution can be, for example, but not limited to, acetone, acetonitrile, dimethoxyethane, dimethyl carbonate, methylethyl carbonate, ethylene carbonate.

In some embodiments, the method of preparing a polymer electrolyte film according to this application further includes: drying product 2 obtained.

The purpose of drying is to remove the residual solvent. Any conventional means in the field can be used for the drying, as long as the purpose of removing the solvent is achieved without degrading the electrolyte film. Drying can be performed by using a vacuum drying oven.

Optionally, the drying temperature does not exceed 140° C., and the drying time at 140° C. does not exceed 1 h.

Optionally, the heat shrinkage temperature of the electrolyte film is around 140-160° C.

In some embodiments, in the method of preparing the polymer electrolyte film according to this application, a ratio of a total mass of monomer 1, monomer 2, and monomer 3 to a mass of monomer 4 is in a range of 20:1 to 2:1.

In some embodiments, in the method of preparing the polymer electrolyte film according to this application, a ratio of a total mass of monomer 1, monomer 2, monomer 3, and monomer 4 to a mass of the lithium salt is in a range of 2.3 to 13.6.

In some embodiments, in the method of preparing the polymer electrolyte film according to this application, a weight ratio of the lithium salt to the initiator is in a range of 5:1 to 60:1; and if the catalyst is used, a ratio of a total weight of the lithium salt and catalyst to a weight of the initiator is in a range of 7:1 to 80:1.

The initiator can be used to initiate block copolymerization of the polymer in this application, and the lithium salt and the catalyst can be used to initiate ionic polymerization of the second polymer. The ratio of the two can reflect the distribution of the two prepared polymers and structural composition of the interpenetrating network to some extent.

According to this application, in the preparation of the polymer and electrolyte film in this application, the solvent used can be acetonitrile or other solvents commonly used in the field, for example, acetone, 1,4-dioxane, N-methylpyrrolidone, dimethyl sulfoxide, ethylene carbonate, dimethyl carbonate, ethylene carbonate, and dimethoxyethane.

It is believed that the polymer in this application is prepared through block copolymerization initiated by the initiator. The second polymer is prepared through ionic polymerization catalyzed by the lithium salt and the optional catalyst. Although monomers of the two polymers are mixed together, the polymers are prepared separately without interfering with each other. Moreover, since the monomers, initiator, and optional catalyst are mixed to uniformity in the solvent before the polymerization, the interpenetrating network structure where the polymer network and the second polymer network uniformly penetrate into each other is obtained after complete polymerization, and the lithium salt is uniformly dispersed in this structure.

It should be understood that the description of the solvent, initiator, and other parameter conditions in the preparation of the electrolyte film also applies to the preparation method of the foregoing polymer.

Optionally, in some embodiments, this application provides a solid-state electrolyte film prepared by using the foregoing method of preparing a solid polymer electrolyte film.

A fifth aspect of this application provides a secondary battery including a positive electrode and a negative electrode, and further including the polymer electrolyte film according to the third aspect of this application or a polymer electrolyte film prepared by using the method according to the fourth aspect of this application. The secondary battery, battery module, battery pack, and electric apparatus of this application are described below.

Secondary Battery

The secondary battery in this application includes a positive electrode plate, a negative electrode plate, and the polymer electrolyte film in this application.

In a charge and discharge process of the battery, active ions are intercalated and deintercalated between the positive electrode plate and the negative electrode plate. The polymer electrolyte film conducts ions between the positive electrode plate and the negative electrode plate.

[Positive Electrode Plate]

The positive electrode plate includes a positive electrode current collector and a positive electrode film layer disposed on at least one surface of the positive electrode current collector, where the positive electrode film layer includes the positive electrode active material according to the first aspect of this application.

For example, the positive electrode current collector includes two opposite surfaces in its thickness direction, and the positive electrode film layer is disposed on either or both of the two opposite surfaces of the positive electrode current collector.

In some embodiments, the positive electrode current collector may be a metal foil current collector or a composite current collector. For example, an aluminum foil may be used as the metal foil. The composite current collector may include a polymer material matrix and a metal layer formed on at least one surface of the polymer material matrix. The composite current collector may be formed by forming a metal material (aluminum, aluminum alloy, nickel, nickel alloy, titanium, titanium alloy, silver, silver alloy, or the like) on a polymer material matrix (for example, matrices of polypropylene (PP), polyethylene terephthalate (PET), polybutylene terephthalate (PBT), polystyrene (PS), and polyethylene (PE)).

In some embodiments, the positive electrode active material may be a well-known positive electrode active material used for batteries in the art. For example, the positive electrode active material may include at least one of the following materials: olivine-structured lithium-containing phosphate, lithium transition metal oxide, and respective modified compounds thereof. However, this application is not limited to such materials, and may alternatively use other conventional well-known materials that can be used as positive electrode active materials for batteries. One type of these positive electrode active materials may be used alone, or two or more of them may be used in combination. Examples of the lithium transition metal oxide may include but are not limited to at least one of lithium cobalt oxide (for example, $LiCoO_2$), lithium nickel oxide (for example, $LiNiO_2$), lithium manganese oxide (for example, $LiMnO_2$ and $LiMn_2O_4$), lithium nickel cobalt oxide, lithium manganese cobalt oxide, lithium nickel manganese oxide, lithium nickel cobalt manganese oxide (for example, $LiNi_{1/3}CO_{1/3}Mn_{1/3}O_2$ ($NCM_{333}$ for short), $LiNi_{0.5}Co_{0.2}Mn_{0.3}O_2$ ($NCM_{523}$ for short), $LiNi_{0.5}Co_{0.25}Mn_{0.25}O_2$ ($NCM_{211}$ for short), $LiNi_{0.6}Co_{0.2}Mn_{0.2}O_2$ ($NCM_{622}$ for short), and $LiNi_{0.85}Co_{0.1}Mn_{0.1}O_2$ ($NCM_{811}$ for short)), lithium nickel cobalt aluminum oxide (for example, $LiNi_{0.85}Co_{0.15}Al_{0.05}O_2$), and modified compounds thereof. Examples of the olivine-structured lithium-containing phosphate may include but are not limited to at least one of lithium iron phosphate (for example, $LiFePO_4$ (LFP for short)), a composite material of lithium iron phosphate and carbon, lithium manganese phosphate (for example, $LiMnPO_4$), composite materials of lithium manganese phosphate and carbon, lithium manganese iron phosphate, and composite materials of lithium manganese iron phosphate and carbon.

Optionally, the positive electrode active material includes lithium cobalt oxide ($LiCoO_2$), lithium manganese oxide ($LiMnO_2$, and $LiMn_2O_4$), lithium nickel cobalt manganese oxide ($LiNi_{0.8}Co_{0.1}Mn_{0.1}O_2$ or $LiNi_{0.6}Co_{0.2}Mn_{0.2}O_2$), and the like.

In some embodiments, the positive electrode film layer further optionally includes a binder. For example, the binder may include at least one of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, and fluorine-containing acrylic resin.

In some embodiments, the positive electrode film layer further optionally includes a conductive agent. For example, the conductive agent may include at least one of superconducting carbon, acetylene black, carbon black, Ketjen black, carbon dots, carbon nanotubes, graphene, and carbon nanofiber.

In some embodiments, the positive electrode includes a positive electrode current collector and a positive electrode film layer, where the positive electrode film layer includes a positive electrode active material, the foregoing second polymer, and the foregoing lithium salt. Optionally, a mass percentage of the second polymer in the positive electrode film layer is 2-15%, and optionally, a mass percentage of the lithium salt in the positive electrode film layer is 0.5-10%.

The lithium salt in the positive electrode film layer may be the same type as the lithium salt in the electrolyte, or different. The description of the lithium salt in the electrolyte film also applies to the lithium salt in the positive electrode film layer.

In some optional embodiments, the positive electrode plate can be prepared by dispersing the positive electrode active material, conductive agent (for example, Super-p), the foregoing monomer 4 for preparing the second polymer, and any other components in a solvent (for example, N-methylpyrrolidone, abbreviated as NMP), then adding the foregoing lithium salt and optionally a catalyst, and mixing to form a uniform positive electrode slurry. The positive electrode slurry is applied on the positive electrode current collector, followed by drying and other processes, to obtain a positive electrode plate. Optionally, the drying can be performed in an oven at 30-100° C. Optionally, in this preparation, the percentage of the positive electrode active material is 80% to 95%, the percentage of the conductive agent is 1% to 5%, the percentage of monomer 4 is 2% to 15%, and the percentage of the lithium salt is 0.5% to 10%, all based on the total weight of the positive electrode active material, conductive agent, monomer 4, and any other components.

Optionally, the lithium salt in the positive electrode film, the lithium salt in the electrolyte film, and the lithium salt used in the optional anion exchange operation are of the same type.

Using the second polymer in the positive electrode film has the following advantages: internal pores of the positive electrode film are filled with the fluid second polymer and the lithium salt, and the fluid second polymer not only infiltrates the interior of the electrode plate, but further provides a channel for lithium ion transport within the plate through its segmental motion, thereby enhancing ion transport within the positive electrode film.

[Negative Electrode Plate]

The negative electrode plate includes a negative electrode current collector and a negative electrode film layer disposed on at least one surface of the negative electrode current collector, where the negative electrode film layer includes a negative electrode active material.

For example, the negative electrode current collector includes two opposite surfaces in its thickness direction, and the negative electrode film layer is disposed on either or both of the two opposite surfaces of the negative electrode current collector.

In some embodiments, the negative electrode current collector may be a metal foil current collector or a composite current collector. For example, for the metal foil, a copper foil may be used. The composite current collector may include a polymer material matrix and a metal layer formed on at least one surface of the polymer material matrix. The composite current collector may be formed by forming a metal material (copper, copper alloy, nickel, nickel alloy, titanium, titanium alloy, silver, silver alloy, or the like) on a polymer material matrix (for example, matrices of polypropylene (PP), polyethylene terephthalate (PET), polybutylene terephthalate (PBT), polystyrene (PS), and polyethylene (PE)).

In some embodiments, in the secondary battery, the negative electrode includes a negative electrode current collector and a metal sheet made of lithium metal or lithium alloy.

The negative electrode current collector can be a copper foil, but is not limited to continuous copper foil, or may be copper wire woven copper mesh, foamy copper, or three-dimensional nanoporous copper.

The polymer electrolyte film in this application is suitable to be used together with a lithium metal negative electrode with a high specific capacity (3860 mAh/g) and a very low potential (−3.04 V vs. $H_2/H^+$) or a lithium alloy negative electrode, or to be used without any negative electrode. Optionally, a thickness of the negative electrode plate is 9-50 μm.

The lithium alloy includes but is not limited to lithium-aluminum alloy, lithium-magnesium alloy, lithium-boron alloy, and the like. It should be understood that the lithium alloy described in this application is not limited to lithium-aluminum alloy, lithium-magnesium alloy, or lithium-boron alloy; other lithium alloys that can achieve the foregoing purposes are also applicable.

In some embodiments, the negative electrode plate can be commercially obtained or can be prepared by directly coating lithium metal and/or lithium alloy onto the current collector by cold pressing.

[Polymer Electrolyte Film]

The electrolyte conducts ions between the positive electrode plate and the negative electrode plate. Specifically, the secondary battery uses the solid polymer electrolyte film described in this application, which can conduct lithium ions well and has high safety performance.

In some embodiments, in the secondary battery, a thickness of the polymer electrolyte film is 10-1000 μm.

The positive electrode plate, the solid polymer electrolyte film, and the negative electrode plate are stacked in sequence to assemble a battery.

[Outer Package]

In some embodiments, the secondary battery may include an outer package for packaging the positive electrode plate, the negative electrode plate, and an electrolyte. For example, the positive electrode plate, the solid polymer electrolyte film, and the negative electrode plate can be laminated to form a battery cell of a laminated structure or wound to form a battery cell of a wound structure, and the battery cell is packaged in the outer package. There may be one or more battery cells in the secondary battery, and the quantity can be adjusted based on needs.

In an embodiment, this application provides an electrode assembly. In some embodiments, the positive electrode plate, the solid-state electrolyte film, and the negative electrode plate can be made into an electrode assembly through a lamination or winding processes. The outer package may be used for packaging the foregoing electrode assembly and the solid-state electrolyte film.

In some embodiments, the outer package of the secondary battery may alternatively be a soft pack, for example, a soft pouch. A material of the soft pack may be plastic, for example, may include one or more of polypropylene (PP), polybutylene terephthalate (PBT), polybutylene succinate (PBS), and the like. In some embodiments, the outer package of the secondary battery may be a hard shell, for example, a hard plastic shell, an aluminum shell, or a steel shell.

Preparation Method of Secondary Battery

In an embodiment, this application provides a method of preparing a secondary battery, where the polymer electrolyte film in this application or a polymer electrolyte film prepared by using the method in this application is used.

The preparation of the secondary battery may further include the step of assembling the negative electrode plate, positive electrode plate, and electrolyte of this application to form the secondary battery. In some embodiments, the positive electrode plate, the polymer electrolyte film, and the negative electrode plate can be stacked in sequence and cold-pressed to form a full cell.

Figure 3:
FIG. 3 is a schematic diagram of a secondary battery according to an embodiment of this application.
Figure 3:
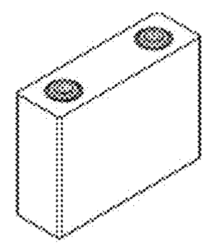

This application does not impose any special limitations on a shape of the secondary battery, and the secondary battery may be cylindrical, rectangular, or of any other shapes. For example, FIG. 3 shows a secondary battery 5 of a rectangular structure as an example.

Figure 4:
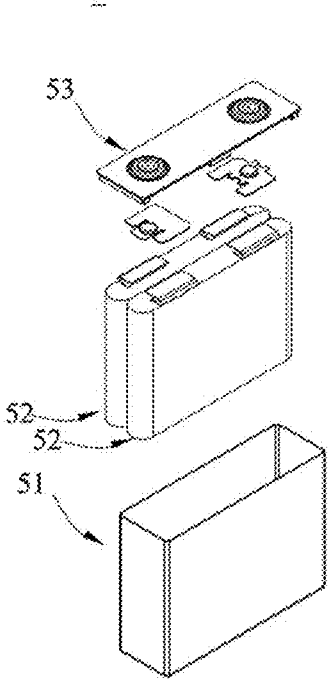
FIG. 4 is an exploded view of the secondary battery according to the embodiment of this application in FIG. 3.

In some embodiments, referring to FIG. 4, the outer package may include a housing 51 and a cover plate 53. The housing 51 may include a base plate and side plates connected to the base plate, and the base plate and the side plates enclose an accommodating cavity. The housing 51 has an opening communicating with the accommodating cavity, and the cover plate 53 can cover the opening to close the accommodating cavity. The positive electrode plate, the negative electrode plate, and the separator may be made into an electrode assembly 52 through winding or lamination. The electrode assembly 52 is packaged in the accommodating cavity. The electrolyte infiltrates the electrode assembly 52. There may be one or more electrode assemblies 52 in the secondary battery 5, and persons skilled in the art may make choices according to actual requirements.

A sixth aspect of this application provides a battery module including the secondary battery according to the fifth aspect of this application.

A seventh aspect of this application provides a battery pack including the battery module according to the sixth aspect of this application.

An eighth aspect of this application provides an electric apparatus including at least one of the secondary battery according to the fifth aspect of this application, the battery module according to the sixth aspect of this application, or the battery pack according to the seventh aspect of this application.

In some embodiments, the secondary battery may be assembled into a battery module, and the battery module may include one or more secondary batteries. The specific quantity may be chosen by persons skilled in the art according to use and capacity of the battery module.

Figure 5:
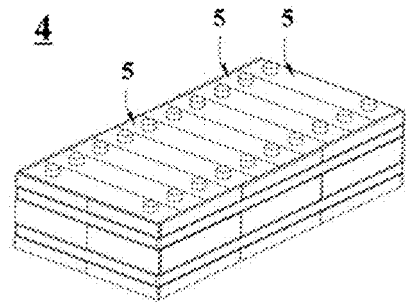
FIG. 5 is a schematic diagram of a battery module according to an embodiment of this application.

FIG. 5 shows a battery module 4 as an example. Referring to FIG. 5, in the battery module 4, a plurality of secondary batteries 5 may be sequentially arranged in a length direction of the battery module 4. Certainly, the batteries may alternatively be arranged in any other manners. Further, the plurality of secondary batteries 5 may be fastened through fasteners.

Optionally, the battery module 4 may further include a housing with accommodating space, and the plurality of secondary batteries 5 are accommodated in the accommodating space.

In some embodiments, the battery module may be further assembled into a battery pack, and the battery pack may include one or more battery modules. The specific quantity may be chosen by persons skilled in the art according to use and capacity of the battery pack.

Figure 6:
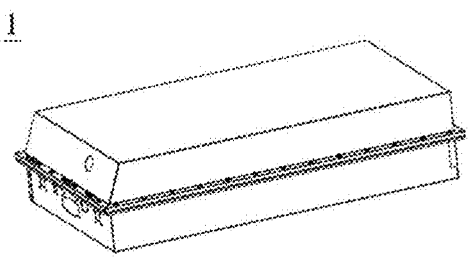
FIG. 6 is a schematic diagram of a battery pack according to an embodiment of this application.
Figure 7:
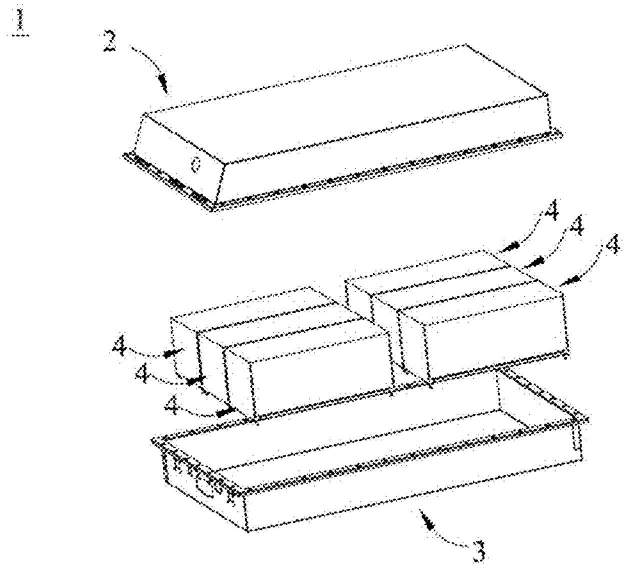
FIG. 7 is an exploded view of the battery pack according to the embodiment of this application in FIG. 6.

FIG. 6 and FIG. 7 show a battery pack 1 as an example. Refer to FIG. 6 and FIG. 7. The battery pack 1 may include a battery box and a plurality of battery modules 4 arranged in the battery box. The battery box includes an upper box body 2 and a lower box body 3. The upper box body 2 can cover the lower box body 3 to form an enclosed space for accommodating the battery modules 4. The plurality of battery modules 4 may be arranged in the battery box in any manner.

In addition, this application further provides an electric apparatus. The electric apparatus includes at least one of the secondary battery, the battery module, or the battery pack provided in this application. The secondary battery, the battery module, or the battery pack may be used as a power source for the electric apparatus or an energy storage unit of the electric apparatus. The electric apparatus may include a mobile device (for example, a mobile phone or a notebook computer), an electric vehicle (for example, a battery electric vehicle, a hybrid electric vehicle, a plug-in hybrid electric vehicle, an electric bicycle, an electric scooter, an electric golf vehicle, or an electric truck), an electric train, a ship, a satellite system, an energy storage system, or the like, but is not limited thereto.

The secondary battery, the battery module, or the battery pack may be selected for the electric apparatus based on requirements for using the electric apparatus.

Figure 8:
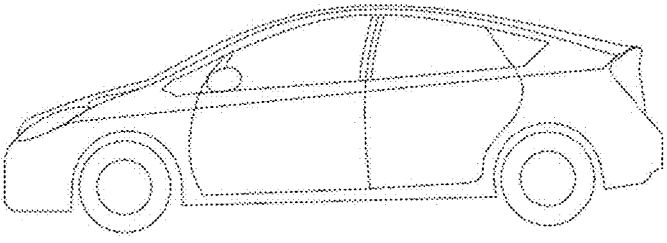
FIG. 8 is a schematic diagram of an electric apparatus using a secondary battery as a power source according to an embodiment of this application.

FIG. 8 shows an electric apparatus as an example. This electric apparatus is a battery electric vehicle, a hybrid electric vehicle, a plug-in hybrid electric vehicle, or the like. To satisfy a requirement of the electric apparatus for high power and high energy density of the secondary battery, a battery pack or a battery module may be used.

In another example, the apparatus may be a mobile phone, a tablet computer, a notebook computer, or the like. Such apparatus is generally required to be light and thin and may use a secondary battery as its power source.

EXAMPLES

The following are examples for describing this application. The examples described below are illustrative and only used for explaining this application, and cannot be construed as limitations on this application. Examples whose technical solutions or conditions are not specified are made in accordance with technical solutions or conditions described in literature in the field or made in accordance with product instructions. The reagents or instruments used are all conventional products that are commercially available if no manufacturer is indicated.

In the following examples, N,N,N-trimethyl-3-(2-methylallylamino)-1-propylammonium chloride, triallyl phosphate, perfluoropolyether acrylate (PFPE-MAA-1000), and fluoroethylene carbonate were purchased from Aladdin Reagent, Monomer-Polymer & Dajac Labs, Suzhou Chemwells, and Aladdin Reagent, respectively.

I. Preparation of Polymer, Second Polymer, Electrolyte Film, and Secondary Battery I-1. Preparation of Polymer At 25° C., under a nitrogen atmosphere, 1.103 g of N,N,N-trimethyl-3-(2-methylallylamino)-1-propylammonium chloride, 0.218 g of triallyl phosphate, 5.465 g of perfluoropolyether acrylate (PFPE-MAA-1000), and 0.063 g of azobisisobutyronitrile (AIBN) were added to 20 mL acetonitrile and these substances were mixed to uniformity through magnetic stirring. The mixture was heated to 65° C. for reaction for 10 h, then dried in a vacuum oven at 45° C. for 6 h to obtain a polymer.

I-2. Preparation of Second Polymer

The second polymer was prepared by using fluoroethylene carbonate for ionic polymerization. The process was as follows:

At a temperature of 65° C., 1.4 g of fluoroethylene carbonate, 0.014 g of stannous octoate, and 1.871 g of lithium bis(fluorosulfonyl)imide were mixed to uniformity for reaction for 10 h to obtain a second polymer with fluidity. The number-average molecular weight of the second polymer was 2000. The molecular weight was tested in the following method:

The above polymer was dissolved in N-methylpyrrolidone (NMP), and gel permeation chromatography (GPC) was used to allow dissolved molecules to pass through chromatographic columns containing microporous fillers, so that they were separated by size. When the sample was separated and eluted from the chromatographic columns, a series of detectors (universal correction and triple detection) may be used for indication.

I-3 Preparation of Polymer Electrolyte Film

At 25° C., 1.103 g of N,N,N-trimethyl-3-(2-methylallylamino)-1-propylammonium chloride (monomer 1), 0.218 g of triallyl phosphate (monomer 2), 5.465 g of perfluoropolyether acrylate (PFPE-MAA-1000) (monomer 3), 0.063 g of azobisisobutyronitrile (AIBN) (initiator), 1.4 g of fluoroethylene carbonate (monomer 4), 0.014 g of stannous octoate (catalyst), and 1.871 g of lithium bis(fluorosulfonyl) imide (lithium salt) were added to 20 mL acetonitrile and these substances were mixed to uniformity. The uniform solution was poured into a polytetrafluoroethylene mold with a fixed depth and kept in a vacuum oven at 65° C. for 10 h. Then the electrolyte film was soaked in 50 mL 3 M LiFSI acetone solution for anion exchange for 12 h, and finally dried in a vacuum oven at 45° C. for 6 hours to obtain a polymer solid-state electrolyte film with a thickness of 15 μm.

The dimensions of the prepared electrolyte film were 100 mm×100 mm×15 μm.

I-4. Preparation of Battery

Step 1: Preparation of Positive Electrode Plate 4.5 g of lithium cobalt oxide ($LiCoO_2$), 0.05 g of conductive agent Super-p, and 0.275 g of fluoroethylene carbonate were added to 2 ml of N-methylpyrrolidone (NMP) and mixed thoroughly, then 1.2 ml of lithium difluorooxalate borate (LiDFOB) and stannous octoate NMP solution (with mass concentrations of 12.5% and 2.1%, respectively) were added to the slurry and mixed quickly and uniformly to obtain a positive electrode slurry. The slurry was applied onto a 13 μm aluminum foil and dried in a blast oven at 50-80° C. to prepare a positive electrode plate.

Step 2: Preparation of Negative Electrode Plate

Negative electrode plate: Lithium metal (purchased from Shenzhen Kejing

Zhida Technology Co., Ltd., specification: 30 μm thickness) was cold-pressed onto copper foil to obtain a negative electrode plate.

Step 3: Preparation of Polymer Electrolyte Film

The preparation of the electrolyte film was as described in I-3.

Step 4: Preparation of Full Cell

The positive electrode plate containing the second polymer, polymer solid-state electrolyte film, lithium metal, or lithium alloy negative electrode plate were stacked in sequence and cold-pressed to assemble a full cell, followed by subsequent charge-discharge and cycling test.

I-5. Comparative Polymer and Comparative Solid-State Electrolyte Film

PEO with an average molecular weight Mv~1,000,000 purchased from Aladdin Reagent was used as for comparison, and the electrolyte film was prepared in the following method:

2 g of PEO powder and 0.3 g of lithium bis(fluorosulfonyl)imide (LiFSI) were dissolved in 35 g of acetonitrile, and stirred until they were completely dissolved. Then 0.7 g of $TiO_2$ powder (10-20 nm) was added, stirred for 30 minutes, and ultrasonically dispersed. The dispersed slurry was poured into a self-made mold and dried in a vacuum oven at 60° C. for 12 h to obtain a PEO electrolyte film.

The dimensions of the electrolyte film were 100 mm×100 mm×15 μm.

II. Performance Evaluation for Polymer, Electrolyte Film, and Battery

II-1. Swelling parameter

The swelling parameters of the polymer prepared in I-1, the second polymer prepared in I-2, and the polymer electrolyte film prepared in I-3 were tested using the following method:

The polymer prepared in I-1, the second polymer prepared in I-2, and the electrolyte film prepared in I-3 were each cut into 30 mm×30 mm square samples, with three parallel samples in each group for each case, and the mass of each sample was weighed. Then, the samples were soaked in a 1M LiFSI ethylene carbonate (EMC) solution for 12 h to swell. After swelling, the excess solvent adhered to the surface of the swollen sample was gently absorbed dry with filter paper, and then the mass of the swollen sample was measured. The swelling parameter was the percentage of a mass increase of the sample after swelling in the original sample mass.

TABLE 1

Swelling parameter test results

| Item under test | Polymer in this application | Second polymer | Electrolyte film |
|---|---|---|---|
| Swelling parameter | 29% | 12% | 24% |

The results in the table indicate that the swelling parameters of the electrolyte film are between those of the polymer and the second polymer, suggesting that the electrolyte film is a blend of the polymer and the second polymer to some extent.

II-2. Flame Retardant Performance

With polyethylene oxide (PEO) as a comparison, the flame retardant performance of the polymer was evaluated.

The thermal conductivity of the polymer prepared in I-1, the electrolyte film prepared in I-3, the comparative polymer PEO in I-5, and the comparative electrolyte film prepared with PEO were measured according to GB T 10294-2008.

The flame retardant performance of the polymer prepared in I-1, the electrolyte film prepared in I-3, the comparative polymer PEO in I-5, and the comparative electrolyte film prepared with PEO were determined according to the UL94 vertical burning test of ASTM D3801.

The performance test results are shown in the following table.

TABLE 2

Flame retardant performance of polymer

| Substance tested | Thermal conductivity ($W\ m^{-1}\ K^{-1}$) | Flame retardant performance |
|---|---|---|
| Polymer prepared in I-1 | 0.25 | UL94 V-0, no dripping |
| Comparative polymer PEO in I-5 | 40 | Burnt within 1 s, dripping |
| Electrolyte film prepared in I-3 | 0.31 | UL94 V-0, no dripping |
| Comparative electrolyte film (PEO) prepared in I-5 | 42 | Burnt within 3 s, dripping |

The results in the table show that the polymer provided in this application and the electrolyte film prepared using the polymer have excellent flame retardant performance than the comparative PEO and comparative electrolyte film.

II-3. Influence of Monomer 1 and Monomer 2 on Performance of Electrolyte Film and Battery

Examples 1 to 9

Examples 1 to 9 were used to investigate the influence of monomer 1 and monomer 2 on the mechanical performance of the electrolyte film and the high-voltage stability and high-voltage cycling performance of the battery. The specific operations are as follows:

Example 1: The full cell was prepared according to I-3 and I-4.

Examples 2 to 9: Prepared similarly to Example 1, except that the molar percentages of monomers 1 to 3 (based on the total number of moles of monomers 1 to 3) were changed. The specific monomer usage amount and molar percentages are shown in the table below.

The performance of the electrolyte films and full cells prepared in Examples 1 to 9 was tested in the following method:

(1) Test for Tensile Strength and Elongation of Electrolyte Film

The electrolyte films in Examples 1 to 9 were cut into rectangular electrolyte film samples with dimensions of 150 mm×20 mm and a thickness of 15 μm. A universal testing machine was used, and according to the ASTM D882-10 standard, the samples were stretched from a relaxed state to a failed state at a crosshead speed of 50 mm/min. The tensile strength and length L at the maximum tensile stress at the time of fracture were recorded, and the elongation at break was calculated as $(L-L_0)/L_0\times100\%$.

(2) Test for High-Voltage Stability of Battery

By using the linear sweep voltammetry method, linear potential sweep was performed on each full cell at a sweep rate of 5.0 $mVs^{-1}$ in the range of 2-6 V, and the change in current was recorded. The electrolyte film was sandwiched between a stainless steel sheet and a lithium metal sheet to assemble a button cell, with the stainless steel sheet as the working electrode and the lithium metal sheet as the reference electrode. Linear potential sweep was performed in the range of 2-6 V at a sweep rate of 1.0 mV/s by using an electrochemical workstation, with the voltage set from the open circuit to 6.0 V. The starting voltage at which the electrolyte film began to oxidatively decompose was recorded. A higher voltage means better stability.

Figure 2:
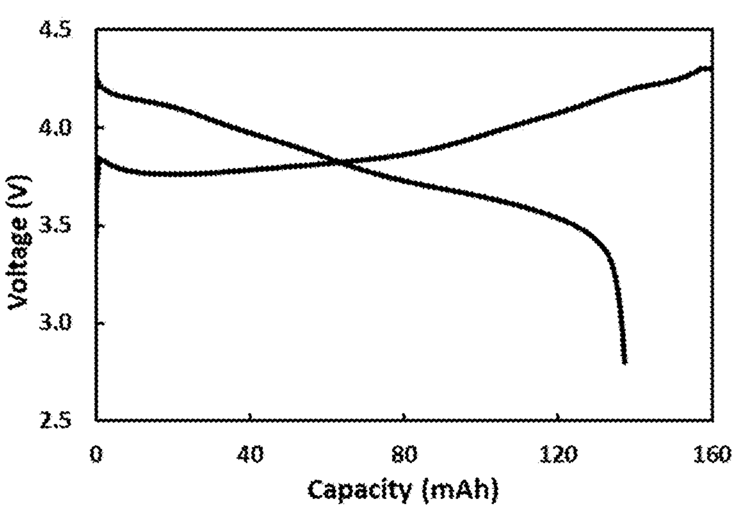
FIG. 2 is a charge-discharge curve diagram of a cell (that is, a battery obtained after matching positive and negative electrodes) when a high-voltage cycling performance test is performed on a solid-state electrolyte film prepared in Example 1.

The graph obtained during the testing of the battery in Example 1 is shown in FIG. 2.

(3) Test for High-Voltage Cycling Performance of Battery

At a charge-discharge rate of 0.5 C to 0.5 C in the voltage range of 2.8-4.3 V, constant current charge-discharge test was performed on the full cells in the examples. The number of cycles (cls) at which each full cell retained 80% of its battery level during high-voltage upper-limit charging was recorded. A large number of cycles means better high-voltage cycling stability.

The test results are shown in the table below.

TABLE 3

| | Polymer | | | | | | | | Battery | |
|---|---|---|---|---|---|---|---|---|---|---|
| | | | | | Monomer 3 | | | | | |
| | Monomer 1 | | Monomer 2 | | Addition | | Electrolyte film | | High- | High-voltage cycling |
| Example number | Addition amount (g) | Mole (%) | Addition amount (g) | Mole (%) | amount (g) | Mole (%) | Tensile strength | Elongation | voltage stability | performance @0.5C-0.5C |
| 1 | 1.103 | 45.45 | 0.218 | 9.10 | 5.465 | 45.45 | 160 MPa | 71% | 5.2 V | 400 cls @80% |
| 2 | 0.221 | 9.10 | 0.218 | 9.10 | 9.836 | 81.80 | 15 MPa | 110% | 4.9 V | 350 cls @80% |
| 3 | 1.985 | 81.80 | 0.218 | 9.10 | 1.094 | 9.10 | 120 MPa | 84% | 5.0 V | 340 cls @80% |
| 4 | 0.049 | 2.0 | 0.218 | 9.10 | 10.69 | 88.90 | 13 MPa | 150% | 5.0 V | 58 cls @80% |
| 5 | 2.087 | 86.0 | 0.218 | 9.10 | 0.589 | 4.90 | 112 MPa | 50% | 5.1 V | 64 cls @80% |
| 6 | 1.103 | 45.45 | 0.050 | 2.10 | 6.307 | 52.45 | 20 MPa | 92% | 5.1 V | 326 cls @80% |
| 7 | 1.103 | 45.45 | 0.653 | 27.27 | 3.280 | 27.28 | 166 MPa | 32% | 4.9 V | 420 cls @80% |
| 8 | 1.103 | 45.45 | 0.012 | 0.50 | 6.499 | 54.05 | 12 MPa | 163% | 5.2 V | 53 cls @80% |
| 9 | 1.103 | 45.45 | 0.958 | 40.00 | 1.750 | 14.55 | 152 MPa | 65% | 4.8 V | 72 cls @80% |

The results in the table show the following:

The high-voltage stability of Examples 1 to 9 is good.

When the molar percentage of monomer 1 is low, for example, as in Examples 4 and 2, the tensile strength of the resulting electrolyte film is relatively low, while the elongation is very high. When the molar percentage of monomer 1 is excessively low, for example, as in Example 4, the high-voltage cycling performance of the corresponding battery obtained significantly decreases. When the molar percentage of monomer 1 is too high, for example, as in Example 5, the elongation of the electrolyte film obtained significantly decreases, and the high-voltage cycling performance of the battery made of such electrolyte film also significantly decreases. Therefore, for monomer 1, the preferred molar percentage is 10-85%.

When the molar percentage of monomer 2 is low, for example, as in Examples 8 and 6, the tensile strength of the obtained electrolyte film is significantly low. When the molar percentage of monomer 2 is excessively low, for example, as in Example 8, the high-voltage cycling performance significantly decreases. When the molar percentage of monomer 2 is high, for example, as in Examples 7 and 9, the elongation of the obtained electrolyte is relatively low. When the molar percentage of monomer 2 is too high, for example, as in Example 9, the high-voltage stability of the battery prepared by using the electrolyte film made from the monomer is low and the high-voltage cycling performance significantly decreases. Therefore, for monomer 2, the preferred molar percentage can be 2.0-33.3%, and more preferably 5%-25%.

In summary, the molar percentage of monomer 1 and the molar percentage of monomer 2 have significant influence on the mechanical strength (tensile strength and elongation) of the corresponding obtained electrolyte film, as well as on the high-voltage stability and high-voltage cycling performance of the corresponding obtained battery.

II-4. Influence of Cations in Monomer 1 and Lithium Salts on Lithium Ion Transference Number of Electrolyte Film Examples 1, 10 and 11

Examples 1, 10 and 11 investigate the influence of the type of cation in monomer 1 and the type of lithium salt on the lithium ion transference number.

Example 1: As described above, the full cell was prepared according to I-3 and I-4.

Example 10: The electrolyte film and full cell were prepared similarly to Example 1, except that in the preparation of the electrolyte film in I-3, the monomer 1 used was the monomer listed in the table below instead of N,N,N-trimethyl-3-(2-methylallylamino)-1-propylammonium chloride, and the lithium salt used was LiBOB instead of LiFSI.

Example 11: The electrolyte film and full cell were prepared similarly to those in Example 1, except that in the preparation of the electrolyte film in I-3, the monomer 1 used was the monomer listed in the table below instead of N,N,N-trimethyl-3-(2-methylallylamino)-1-propylammonium chloride, and the lithium salt used was $LiBF_4$ instead of LiFSI.

Comparative Example 1: The electrolyte film and full cell were prepared similarly to Example 1, except that in the preparation of the electrolyte film in I-3, the monomer 1 used was the monomer listed in the table below instead of N,N,N-trimethyl-3-(2-methylallylamino)-1-propylammonium chloride.

The lithium ion transference number of the electrolyte films prepared in each example and comparative example was tested in the following method:

The lithium ion transference number in the polymer solid-state electrolyte was measured by using the potentiostatic polarization method. The test method of lithium ion transference number $t_+$ is as follows:

A Li/polymer solid-state electrolyte/Li symmetric cell was made, a small and constant potential difference $\Delta V$ (approximately 10 mV) was applied to the symmetric cell under test, and the current change over time was recorded. In the initial state, all the migratable ions in the battery system affected charge transfer. At this time, the current was at its maximum, and recorded as $I_0$ (initial current). As polarization proceeded, a stable ion concentration gradient was gradually formed inside the battery, and anion migration was suppressed. The current in the battery system was contributed by cations (that is, lithium ions), and the current at this time was recorded as $I_s$ (steady-state current). The lithium ion transference number $t_+$ can be calculated using formula 1:

$$t_+ = \frac{I_s(\Delta V - I_0 R_{el}^0)}{I_0(\Delta V - I_s R_{el}^s)} \quad \text{formula 1}$$

$R^0_{el}$ and $R^s_{el}$ were the interfacial impedances of the electrode and polymer electrolyte film before and after polarization, respectively. The interfacial impedance can be obtained through electrochemical impedance spectroscopy (Electrochemical Impedance Spectroscopy, EIS for short, also referred to as alternating current impedance spectroscopy): a small amplitude sinusoidal voltage signal with frequency w1 was applied to the battery system, and the system generated a sinusoidal alternating current response with frequency w2. A ratio of the applied voltage to the generated current was the impedance of the system. The complex plane plot of this value as a function of sinusoidal frequency ω was a Nyquist plot, the semicircular part in the high-frequency region corresponding to the charge transfer process, and the semicircular diameter representing the interfacial impedance.

TABLE 4

| No. | Monomer 1 | Type of group $A^+$ in monomer 1 | Lithium salt | Lithium ion transference number |
|---|---|---|---|---|
| Example 1 | 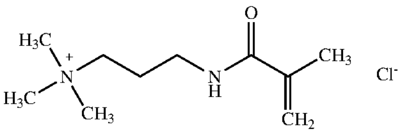 | Ammonium cation | LiFSI | 0.78 |
| Example 10 | 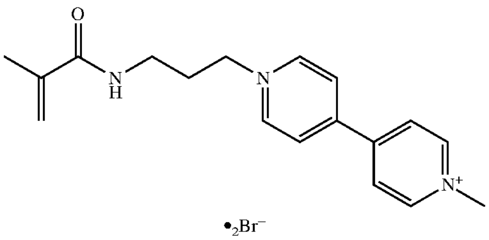 | Pyridinium | LiBOB | 0.66 |
| Example 11 | 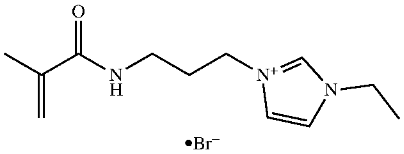 | Imidazolium | $LiBF_4$ | 0.52 |
| Comparative Example 1 | 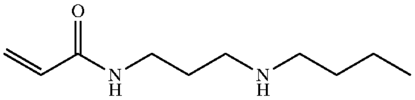 | NH | LiFSI | 0.36 |

The results in the table show that as compared with Comparative Example 1 without a cation, using monomer 1 containing a cation helps to increase the lithium ion transference number of the polymer solid-state electrolyte. In addition, a higher charge density around the cation means a stronger dissociation capability of the lithium salt, and a greater lithium ion transference number.

II-5. Influence of Monomer 3 on Performance of Electrolyte Film and Battery

Examples 12 to 23

The influence of the type of Rf in monomer 3, fluorine substitution rate, type of group E, and the amount of monomer 3 on the performance of the electrolyte film and battery was investigated.

Examples 12 to 15: The electrolyte film and full cell were prepared similarly to Example 1, except that the molar percentage of monomer 3 was not changed (the amounts of monomers 1 and 2 were adjusted according to the molar percentage in Example 1 and the mass of monomer 3 in Table 3), and only the Rf group and E group in monomer 3 were changed. See Table 5 below for details.

Example 16: The amounts of monomer 1, monomer 2, and monomer 3 were 0.221 g, 0.218 g, and 9.836 g, respectively, with molar percentages of 9.10%, 9.10%, and 81.80%, respectively.

Example 17: The amounts of monomer 1, monomer 2, and monomer 3 were 1.985 g, 0.218 g, and 1.094 g, respectively, with molar percentages of 81.80%, 9.10%, and 9.10%, respectively.

Example 18: The amounts of monomer 1, monomer 2, and monomer 3 were 0.049 g, 0.218 g, and 10.690 g, respectively, with molar percentages of 2.0%, 9.10%, and 88.90%, respectively.

Example 19: The amounts of monomer 1, monomer 2, and monomer 3 were 2.087 g, 0.218 g, and 0.589 g, respectively, with molar percentages of 86.0%, 9.10%, and 4.90%, respectively.

The electrolyte films and full cells prepared in each example were subjected to the following tests:

(1) Test for Ionic Conductivity

The electrolyte film was cut into discs with a diameter ø of 19 mm, and an R2032 button cell was assembled with a structure of stainless steel sheet plus electrolyte film plus stainless steel sheet. After the cell was left standing for 12 h, the electrochemical impedance spectroscopy (EIS) test was performed using an electrochemical workstation, with frequency scanning from 0.1 to 105 Hz and a voltage amplitude of 5 mV. The intersection of the graph with the horizontal axis was the impedance R of the polymer film, and the ionic conductivity σ could be calculated according to the formula:

$$\sigma = d/RA$$

where d was the thickness of the electrolyte film, R was the impedance value, and A was the area of the electrolyte film.

(2) Test for Percentage of Element Fluorine in Electrolyte Film

The percentage of element fluorine in the electrolyte film was determined by X-ray photoelectron spectroscopy (XPS).

(3) Calculation of fluorine substitution rate in Rf group:

The fluorine substitution rate is based on the number of hydrogen atoms that is capable of being substituted in the Rf group, that is, the number of fluorine atoms/(all halogen atoms+hydrogen atoms).

(4) Calculation of molar percentage of monomer 3: The mass of monomer 3/molecular weight of monomer 3 gives the number of moles of monomer 3, and the number of moles of monomer 3/(number of moles of monomer 1+number of moles of monomer 2+number of moles of monomer 3) gives the molar percentage of monomer 3.

The test for lithium ion transference number of the electrolyte film and the high-voltage stability and high-voltage cycling performance of the battery are described above.

TABLE 5

| | Monomer 3 | | | | | Electrolyte film | | | Battery | |
|---|---|---|---|---|---|---|---|---|---|---|
| Examples | Type of Rf group | Fluorine substitution rate (%) | Group E | Mass (g) | Mole (%) | Percentage of element fluorine (wt %) | Ionic conductivity | Lithium ion transference number | High-voltage stability (V) | High-voltage cyclicity (cls 80%) |
| 12 | —$OCF_2CH_2OCF_2CH_2OCH_2CH_2OCF_2CH_2OCF_2CH_2OCH_2CH_2OCH_3$ | 29.63 | 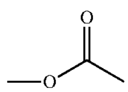 | 2.915 | 45.45 | 13.4 | $8.1 \times 10^{-4}$ | 0.65 | 4.9 | 402 |
| 13 | —$OCH_2CF_2OCF_2CF_2OCF_2CH_2OH$ | 61.54 | 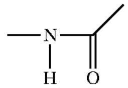 | 2.180 | 45.45 | 14.9 | $6.3 \times 10^{-4}$ | 0.56 | 5.0 | 373 |
| 14 | —$CF(CF_3)[OCF_2CF(CF_3)]_6OCF_2CF_2(CF_3)$ | 100.0 | 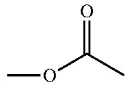 | 7.125 | 45.45 | 40.2 | $9.2 \times 10^{-4}$ | 0.73 | 5.1 | 433 |

TABLE 5-continued

| | Monomer 3 | | | | | Electrolyte film | | | Battery | |
|---|---|---|---|---|---|---|---|---|---|---|
| Examples | Type of Rf group | Fluorine substitution rate (%) | Group E | Mass (g) | Mole (%) | Percentage of element fluorine (wt %) | Ionic conductivity | Lithium ion transference number | High-voltage stability (V) | High-voltage cyclicity (cls 80%) |
| 15 | —$CF_2CF_2OCF_2CF_2CF_2OCF_2CH(CF_3)$ | 94.44 | 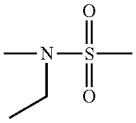 | 3.285 | 45.45 | 23.6 | $7.4 \times 10^{-4}$ | 0.61 | 5.0 | 392 |
| 16 | —$CF(CF_3)(OCF_2CF(CF_3))_4OCF_2CF_2(CF_3)$ | 100.0 | 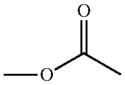 | 9.836 | 81.8 | 46.0 | $4.3 \times 10^{-4}$ | 0.45 | 5.1 | 321 |
| 17 | —$CF(CF_3)(OCF_2CF(CF_3))_4OCF_2CF_2(CF_3)$ | 100 | 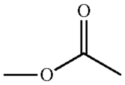 | 1.094 | 9.1 | 13.9 | $3.5 \times 10^{-4}$ | 0.82 | 5.0 | 308 |
| 18 | —$CF(CF_3)(OCF_2CF(CF_3))_4OCF_2CF_2(CF_3)$ | 100 | 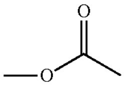 | 10.690 | 88.90 | 47.4 | $9.1 \times 10^{-4}$ | 0.32 | 5.0 | 265 |
| 19 | —$CF(CF_3)(OCF_2CF(CF_3))_4OCF_2CF_2(CF_3)$ | 100 | 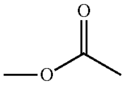 | 0.589 | 4.90 | 9.9 | $1.5 \times 10^{-5}$ | 0.86 | 5.1 | 208 |
| Comparative Example 2 | PEO as solid-state electrolyte film | | | | | 0 | $1.9 \times 10^{-6}$ | 0.18 | 4.2 | 102 |

The results in the table show the following:

Compared with Comparative Example 2, each example achieves better electrolyte film performance and battery performance.

The molar percentage of monomer 3 among monomers 1-3 being in the range of 8-85%, optionally in the range of 8-80% can achieve better performance of the electrolyte film and the battery.

A high fluorine substitution rate in the Rf group, greater than 29.0%, is beneficial for achieving better high-voltage stability of the battery.

A higher percentage of element fluorine in the electrolyte film means a better ionic conductivity of the electrolyte film and better high-voltage stability of the battery. However, an excessively high percentage of element fluorine in the electrolyte film may be detrimental to the lithium ion transference number of the electrolyte film and the high-voltage cycling performance of the battery. As shown in the table, the percentage of element fluorine in the electrolyte film in the range of 12.5-46% can achieve better electrolyte film performance and battery performance.

II-6. Influence of Amounts of Monomer in the Second Polymer and Lithium Salt on Performance of Electrolyte Film and Battery Examples 1, and 20 to 27

The influence of monomer 4 for preparing the second polymer on the performance of the electrolyte film and battery was investigated.

Example 1: The same as above

Examples 24 to 27: Prepared similarly to Example 1, except that the amounts of monomers 1 to 3 and the amount of lithium salt added were kept unchanged, and only the amount of monomer 4 was changed.

Examples 28 to 31: Prepared similarly to Example 1, except that the amounts of monomers 1 to 4 were kept unchanged, and only the amount of lithium salt added was changed.

In the table, the mass percentage of the lithium salt is calculated as the mass of the lithium salt/(total mass of monomers 1 to 4+initiator+lithium salt+catalyst)×100%.

The tests for tensile strength, elongation, high-voltage stability, and high-voltage cycling performance are described above. The test results are shown in the table below.

TABLE 6

| Example number | Addition amount of monomer 4 (g) | Ratio of total mass of monomers 1 to 3 to monomer 4 | Lithium salt: Addition amount (g) | Lithium salt: Mass ratio of monomers 1 to 4 to lithium salt | Electrolyte film: Mass percentage of lithium salt (%) | Electrolyte film: Tensile strength | Electrolyte film: Elongation | Battery: High-voltage stability | Battery: High-voltage cyclicity (cls @80%) |
|---|---|---|---|---|---|---|---|---|---|
| 1 | 1.4 | 4.8 | 1.871 | 4.4 | 18.6 | 160 MPa | 71% | 5.2 V | 400 |
| 20 | 0.35 | 19.4 | 1.871 | 3.8 | 20.8 | 181 MPa | 55% | 5.1 V | 342 |
| 21 | 3.0 | 2.3 | 1.871 | 5.2 | 16.1 | 153 Mpa | 90% | 5.2 V | 389 |
| 22 | 0.15 | 45.2 | 1.871 | 3.7 | 21.2 | 194 Mpa | 23% | 4.9 V | 211 |
| 23 | 5.0 | 1.4 | 1.871 | 6.3 | 13.7 | 142 Mpa | 146% | 4.9 V | 173 |
| 24 | 1.4 | 4.8 | 0.60 | 13.6 | 6.8 | 121 MPa | 96% | 5.0 V | 366 |
| 25 | 1.4 | 4.8 | 3.50 | 2.3 | 30.0 | 126 Mpa | 65% | 4.8 V | 334 |
| 26 | 1.4 | 4.8 | 0.30 | 27.3 | 3.5 | 89 Mpa | 125% | 5.1 V | 213 |
| 27 | 1.4 | 4.8 | 4.0 | 2.0 | 32.8 | 91 Mpa | 35% | 4.6 V | 63 |

The results in the table show that when the ratio of the total mass of monomers 1 to 3 to the mass of monomer 4 is 2-20, the mass ratio of monomers 1 to 4 to the lithium salt is 2.3-13.6, and the mass percentage of the lithium salt in the electrolyte film is 6.8-30.0%, the electrolyte film achieves better tensile strength and elongation, and the battery achieves better high-voltage stability and high-voltage cyclicity.

It should be noted that this application is not limited to the foregoing embodiments. The foregoing embodiments are merely examples, and embodiments having substantially the same constructions and the same effects as the technical idea within the scope of the technical solutions of this application are all included in the technical scope of this application. In addition, without departing from the essence of this application, various modifications made to the embodiments that can be conceived by persons skilled in the art, and other manners constructed by combining some of the constituent elements in the embodiments are also included in the scope of this application.

What is claimed is:

1. A polymer, obtained by polymerizing monomer 1, monomer 2, and monomer 3, wherein monomer 1 has a structure of formula 1, monomer 2 has a structure of formula 2, and monomer 3 has a structure of formula 3:

formula 1

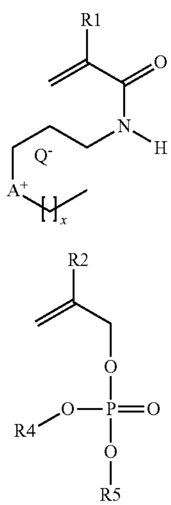

formula 2

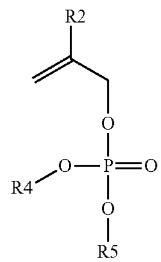

-continued formula 3

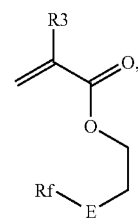

wherein

R1 and R3 are each independently selected from hydrogen or $C_{1-10}$ alkyl;

R4 is selected from $C_{1-10}$ hydrocarbyl or $C_{1-10}$ hydrocarbyl containing one or more elements of fluorine, chlorine, bromine, iodine, nitrogen, oxygen, sulfur, silicon, boron, and phosphorus;

R2 and R5 are each independently selected from hydrogen, $C_{1-10}$ hydrocarbyl, or hydrocarbyl containing one or more elements of fluorine, chlorine, bromine, iodine, nitrogen, oxygen, sulfur, silicon, boron, and phosphorus, having a carbon atom count of less than or equal to 10, and containing C═C or C≡C;

Rf is selected from hydrogen, or ethoxy segment containing one or more elements of fluorine, chlorine, bromine, iodine, nitrogen, oxygen, sulfur, silicon, boron, and phosphorus and having a carbon atom count of less than or equal to 16;

x is the number of repeating units of methylene, and $0 \leq x \leq 20$;

$A^+$ is selected from one of functional groups with nitrogen, sulfur, or phosphorus as a cationic center;

$Q^-$ is one, two or more anions selected from halide ion, haloborate, halo(oxalate) borate, perhalate, halophosphate, and halosulfonimide, and optionally Q is one, two or more anions selected from chloride ion, tetrafluoroborate, difluorooxalate borate, perchlorate, hexafluorophosphate, and bis(fluorosulfonyl)imide; and E is selected from structures of (1) to (3):

(1)

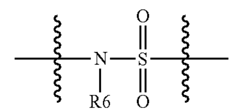

-continued (2)

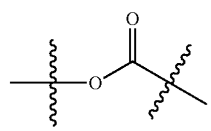

(3)

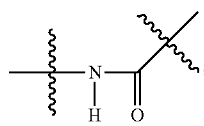

wherein R6 is selected from hydrogen or $C_{1-10}$ alkyl.

2. The polymer according to claim 1, wherein in the Rf group, a fluorine substitution rate is greater than 29.0%, and the fluorine substitution rate is a percentage of the number of element fluorine based on the number of hydrogen atoms capable of being substituted in the Rf group.

3. The polymer according to claim 1, characterized in that the cation $A^+$ is selected from one of structural formulas (4) to (6):

(4)

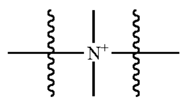

(5)

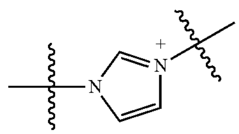

(6)

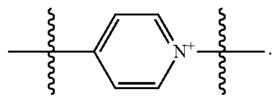

4. The polymer according to claim 1, wherein a molar percentage range of monomer 1 is 3.7-92.6 mol %, a molar percentage range of monomer 2 is 2.0-33.3 mol %, and a molar percentage range of monomer 3 is 3.7-92.6 mol %, all of which are based on the total number of moles of monomer 1, monomer 2, and monomer 3, optionally, a molar percentage of monomer 1 to monomer 2 is in a range of 1:1 to 25:1; and more optionally, a molar percentage of monomer 3 to monomer 2 is in a range of 1:1 to 25:1.

5. The polymer according to claim 1, wherein thermal conductivity of the polymer is in a range of 0.06-0.35 W/m K, and a flame retardant grade thereof is 94V-0 or 94V-1.

6. A method of preparing the polymer according to claim 1, comprising the following steps: dissolving monomer 1, monomer 2, monomer 3, and an initiator in a solvent for reaction in vacuum at 30-100° C. for 0.2-24 h, and then performing drying.

7. A polymer electrolyte film, comprising the polymer according to claim 1.

8. The polymer electrolyte film according to claim 7, further comprising a second polymer, wherein the second polymer is dispersed in the polymer to form an interpenetrating network structure, and the second polymer is formed by monomer 4, wherein a general structure of monomer 4 is as follows:

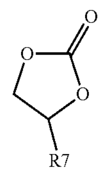

wherein

R7 is selected from hydrogen, or hydrocarbyl with a carbon atom count of less than 7 that is unsubstituted or substituted by one or more elements of fluorine, bromine, iodine, nitrogen, oxygen, sulfur, silicon, boron, and phosphorus.

9. The polymer electrolyte film according to claim 7, further comprising a lithium salt, wherein the lithium salt is selected from one or more of lithium hexafluorophosphate, lithium tetrafluoroborate, lithium bis(fluorosulfonyl)imide, lithium bis(trifluoromethanesulfonyl)imide, lithium difluorooxalate borate, lithium perchlorate, lithium bis(oxalate) borate.

10. The polymer electrolyte film according to claim 9, wherein a mass percentage of the lithium salt is in a range of 6.8-30.0% based on a total mass of the polymer electrolyte film.

11. The polymer electrolyte film according to claim 8, wherein a percentage of element fluorine is in a range of 12.5-46.0% based on a total weight of the polymer electrolyte film.

12. A secondary battery, further comprising a positive electrode and a negative electrode, and further comprising the polymer electrolyte film according to claim 7.

13. The secondary battery according to claim 12, wherein a thickness of the polymer electrolyte film is in a range of 10-1000 μm.

14. The secondary battery according to claim 12 or 13, wherein the negative electrode comprises a negative electrode current collector and a metal sheet made of lithium metal and/or lithium alloy.

15. A method of preparing a polymer electrolyte film, the method comprising:

reacting monomer 1, monomer 2, monomer 3, monomer 4, a lithium salt, and an initiator at 30-100° C. for 0.2-24 h to obtain product 1, wherein monomer 1 has a structure of formula 1, monomer 2 has a structure of formula 2, monomer 3 has a structure of formula 3, and monomer 4 has a structure of formula 4:

formula 1

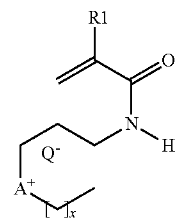

-continued formula 2

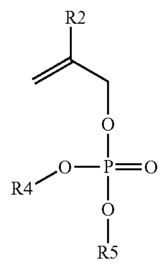

formula 3

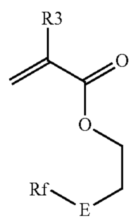

formula 4

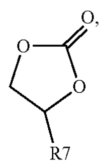

wherein

R1 and R3 are each independently selected from hydrogen or $C_{1-10}$ alkyl;

R4 is selected from $C_{1-10}$ hydrocarbyl or $C_{1-10}$ hydrocarbyl containing one or more elements of fluorine, chlorine, bromine, iodine, nitrogen, oxygen, sulfur, silicon, boron, and phosphorus;

R2 and R5 are each independently selected from hydrogen, $C_{1-10}$ hydrocarbyl, or hydrocarbyl containing one or more elements of fluorine, chlorine, bromine, iodine, nitrogen, oxygen, sulfur, silicon, boron, and phosphorus, having a carbon atom count of less than or equal to 10, and containing C═C or C≡C;

Rf is selected from hydrogen, or ethoxy segment containing one or more elements of fluorine, chlorine, bromine, iodine, nitrogen, oxygen, sulfur, silicon, boron, and phosphorus and having a carbon atom count of less than or equal to 16;

x is the number of repeating units of methylene, and $0 \leq x \leq 20$;

$A^+$ is selected from one of functional groups with nitrogen, sulfur, or phosphorus as a cationic center;

$Q^-$ is one, two or more anions selected from halide ion, haloborate, halo(oxalate) borate, perhalate, halophosphate, and halosulfonimide, and optionally Q is one, two or more anions selected from chloride ion, tetrafluoroborate, difluorooxalate borate, perchlorate, hexafluorophosphate, and bis(fluorosulfonyl)imide; and E is selected from structures of (1) to (3):

(1)

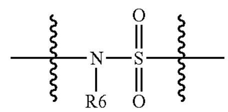

(2)

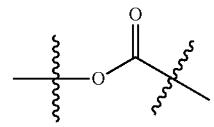

(3)

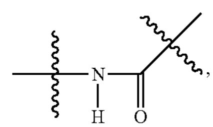

R6 is selected from hydrogen or $C_{1-10}$ alkyl,

R7 is selected from hydrogen, or hydrocarbyl with a carbon atom count of less than 7 that is unsubstituted or substituted by one or more elements of fluorine, bromine, iodine, nitrogen, oxygen, sulfur, silicon, boron, and phosphorus, the lithium salt is selected from one or more of lithium hexafluorophosphate, lithium tetrafluoroborate, lithium bis(fluorosulfonyl)imide, lithium bis(trifluoromethanesulfonyl)imide, lithium difluorooxalate borate, lithium perchlorate, lithium bis(oxalate) borate.

16. The method of preparing a polymer electrolyte film according to claim 15, further comprising: performing anion exchange on the obtained product 1 with a lithium salt solution to obtain product 2.

17. The method of preparing a polymer electrolyte film according to claim 16, further comprising: drying product 2 obtained.

18. The method of preparing a polymer electrolyte film according to claim 15, wherein a ratio of a total mass of monomer 1, monomer 2, and monomer 3 to a mass of monomer 4 is in a range of 20:1 to 2:1.

19. The method of preparing a polymer electrolyte film according to claim 15, wherein a ratio of a total mass of monomer 1, monomer 2, monomer 3, and monomer 4 to a mass of the lithium salt is in a range of 2.3 to 13.6.

20. The method of preparing a polymer electrolyte film according to claim 15, further comprising reacting monomer 1, monomer 2, monomer 3, monomer 4, the lithium salt, and the initiator in presence of a catalyst, wherein a weight ratio of the lithium salt to the initiator is in a range of 5:1 to 60:1; and if the catalyst is used, a ratio of a total weight of the lithium salt and the catalyst to a weight of the initiator is in a range of 7:1 to 80:1.

* * * * *